United States Patent
Gupta et al.

(10) Patent No.: US 11,682,149 B2
(45) Date of Patent: Jun. 20, 2023

(54) EDITING DIGITAL IMAGES UTILIZING EDGE AWARE TRANSFORMATIONS BASED ON VECTOR SPLINES AND MESHES FOR MULTIPLE IMAGE REGIONS

(71) Applicant: Adobe Inc., San Jose, CA (US)

(72) Inventors: Angad Kumar Gupta, Ghaziabad (IN); Ashwani Chandil, Noida (IN)

(73) Assignee: Adobe Inc., San Jose, CA (US)

( * ) Notice: Subject to any disclaimer, the term of this patent is extended or adjusted under 35 U.S.C. 154(b) by 188 days.

(21) Appl. No.: 17/171,402

(22) Filed: Feb. 9, 2021

(65) Prior Publication Data
US 2022/0254078 A1   Aug. 11, 2022

(51) Int. Cl.
*G06T 11/60* (2006.01)
*G06T 7/13* (2017.01)
*G06T 11/20* (2006.01)

(52) U.S. Cl.
CPC .............. *G06T 11/60* (2013.01); *G06T 7/13* (2017.01); *G06T 11/203* (2013.01)

(58) Field of Classification Search
CPC .......... G06T 11/203; G06T 7/13; G06T 11/60
See application file for complete search history.

(56) References Cited

U.S. PATENT DOCUMENTS

| | | | | | |
|---|---|---|---|---|---|
| 5,615,287 | A | * | 3/1997 | Fu | G06T 9/007 382/199 |
| 5,929,980 | A | * | 7/1999 | Yamaguchi | G01B 11/24 382/199 |
| 6,781,597 | B1 | * | 8/2004 | Vrobel | G06T 19/20 715/848 |
| 7,302,650 | B1 | * | 11/2007 | Allyn | G06F 3/04812 715/792 |
| 8,994,736 | B2 | * | 3/2015 | Carr | G06F 3/002 345/646 |
| 2014/0104419 | A1 | * | 4/2014 | Metzler | G06T 7/181 348/140 |
| 2015/0125091 | A1 | * | 5/2015 | Gallo | G06T 7/33 382/275 |
| 2019/0197771 | A1 | * | 6/2019 | Batra | G06T 11/00 |
| 2019/0295217 | A1 | * | 9/2019 | Phogat | G06T 3/0093 |

OTHER PUBLICATIONS

Adobe.com; Transform Objects; Date downloaded Feb. 17, 2021; https://helpx.adobe.com/photoshop/using/transforming-objects.html.
Adobe.com; Use the Liquify Filter; Date downloaded Feb. 17, 2021; https://helpx.adobe.com/photoshop/using/liquify-filter.html.

* cited by examiner

*Primary Examiner* — Phi Hoang
(74) *Attorney, Agent, or Firm* — Keller Preece PLLC

(57) ABSTRACT

The present disclosure relates to systems, methods, and non-transitory computer-readable media that utilize simultaneous, multi-mesh deformation to implement edge aware transformations of digital images. In particular, in one or more embodiments, the disclosed systems generates a transformation handle that targets an edge portrayed in a digital image. In some cases, the disclosed systems provide the transformation handle for display over the digital image. Additionally, in one or more embodiments, the disclosed systems generate vectors splines and meshes for the edge and one or more influenced regions adjacent to the edge. In response to detecting a user interaction with the transformation handle, the disclosed systems can modify the edge and the at least one influenced region by modifying the corresponding vector splines and meshes.

20 Claims, 16 Drawing Sheets

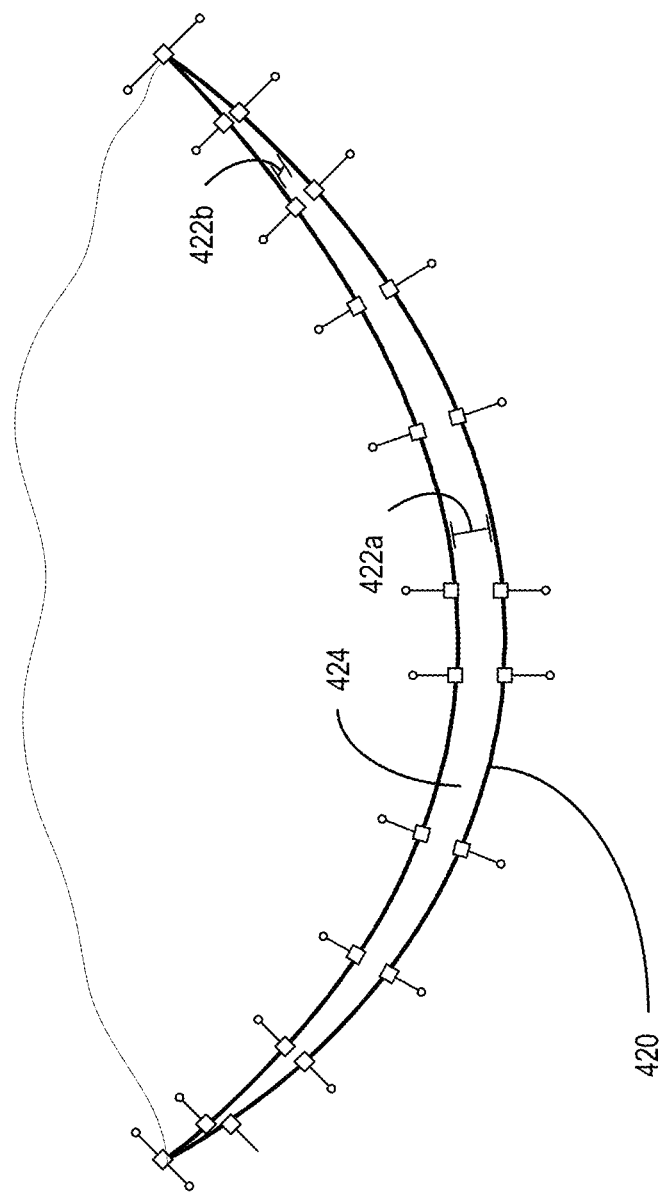

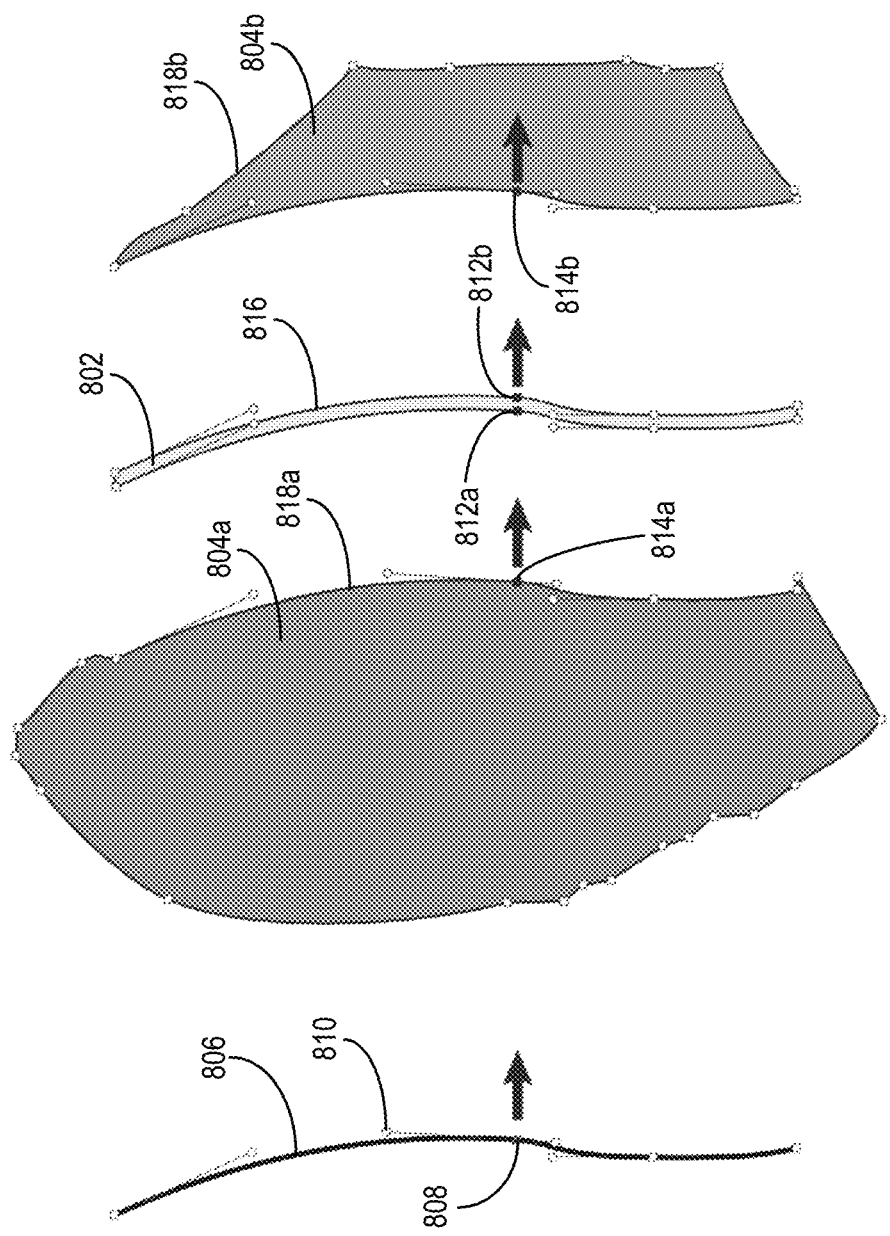

1100

```
┌─────────────────────────────────────────────────────────────────┐
│ Determining An Edge And An Adjacent Influenced Region From A Digital Image │
│                              1102                               │
└─────────────────────────────────────────────────────────────────┘
                                  │
                                  ▼
┌─────────────────────────────────────────────────────────────────┐
│ Generating An Edge-Targeting Transformation Handle For The Digital Image 1104 │
└─────────────────────────────────────────────────────────────────┘
                                  │
                                  ▼
┌─────────────────────────────────────────────────────────────────┐
│   Generating Meshes For The Edge And The Adjacent Influenced Region 1106   │
└─────────────────────────────────────────────────────────────────┘
                                  │
                                  ▼
┌─────────────────────────────────────────────────────────────────┐
│ Modifying The Edge And The Adjacent Influenced Region By Modifying The │
│                          Meshes 1108                            │
└─────────────────────────────────────────────────────────────────┘
```

*Fig. 11*

EDITING DIGITAL IMAGES UTILIZING EDGE AWARE TRANSFORMATIONS BASED ON VECTOR SPLINES AND MESHES FOR MULTIPLE IMAGE REGIONS

BACKGROUND

Recent years have seen significant advancement in hardware and software platforms that perform various tasks for editing digital images. In particular, many conventional systems provide various tools that can be implemented for enhancing and transforming the visual appearance of a digital image. For example, conventional systems provide tools that can be utilized to warp, skew, distort, re-color, or otherwise modify at least a portion of a digital image.

Despite these advances, however, conventional image editing systems suffer from several technological shortcomings that result in inaccurate, inflexible, and inefficient operation. This is particularly true with regard to modifying the location, orientation, or shape of edges or features portrayed in a digital image. For example, conventional image editing systems often utilize transformation tools that are not adapted for altering edges, and therefore, generate imprecise modified digital images. To illustrate, conventional systems often utilize warping or brush-based tools to alter a set of pixels, which can include pixels from an edge and pixels from a filled region. Because these tools manipulate all pixels in the same manner, such systems tend to lose the detail of the edges (e.g., the overall edge shape) in the transformation. Accordingly, these conventional systems tend to apply transformations that result in the edges appearing unnatural, such as by having bulges that result from the pixel manipulation.

In addition to accuracy concerns, conventional image editing systems are often inflexible in that they rigidly utilize the same tools regardless of the portion of the digital image to be transformed. To illustrate, conventional systems typically fail to flexibly adapt transformation tools for altering the edges of objects portrayed in digital images. Rather, such systems generally use the same tools that are utilized for modifying the filled regions (e.g., the regions bounded by edges) of those objects. In other words, conventional systems generally treat pixels associated with an edge and pixels associated with a filled region the same.

Further, conventional image editing systems suffer from inefficiencies. Indeed, because of the imprecision of the transformation tools implemented, conventional systems require a significant amount of fine tuning to improve upon the transformed appearance of an edge. Thus, to reach a desired level of precision in transforming an edge, such systems often require a trial-and-error process applied through a significant amount of user interaction and utilizes excessive computing resources (including computer processing and memory).

The foregoing drawbacks, along with additional technical problems and issues, exist with regard to conventional data relationship analysis systems.

SUMMARY

One or more embodiments described herein provide benefits and/or solve one or more of the foregoing or other problems in the art with systems, methods, and non-transitory computer-readable media that flexibly target edges portrayed in digital images for precise and efficient transformation. In particular, in one or more embodiments, the disclosed systems utilize simultaneous, multi-mesh deformation to implement edge aware transformations. To illustrate, in one or more embodiments, the disclosed systems determine, from a digital image, an edge to be transformed and a surrounding influenced region. The disclosed systems further display anchor points on the edge for direct edge manipulation. Based upon user interaction with the anchor points, the disclosed systems transform the edge and simultaneously transform the surrounding influenced area. In one or more embodiments, the disclosed systems transform the edge and the surrounding area utilizing corresponding meshes that are bonded together. In this manner, the disclosed systems provide more flexible and precise edge transformations. Further, the disclosed systems increase efficiency by reducing user interaction, time, and computer resources required to fine tune the transformations.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 4C illustrates an edge-targeting transformation handle that includes a closed vector spline that outlines an edge selected for transformation in accordance with one or more embodiments;

FIGS. 8A-8D illustrate modifying an edge and adjacent influenced regions in accordance with one or more embodiments;

FIG. 11 illustrates a flowchart of a series of acts for transforming an edge portrayed in a digital image in accordance with one or more embodiments;

DETAILED DESCRIPTION

Figure 1:
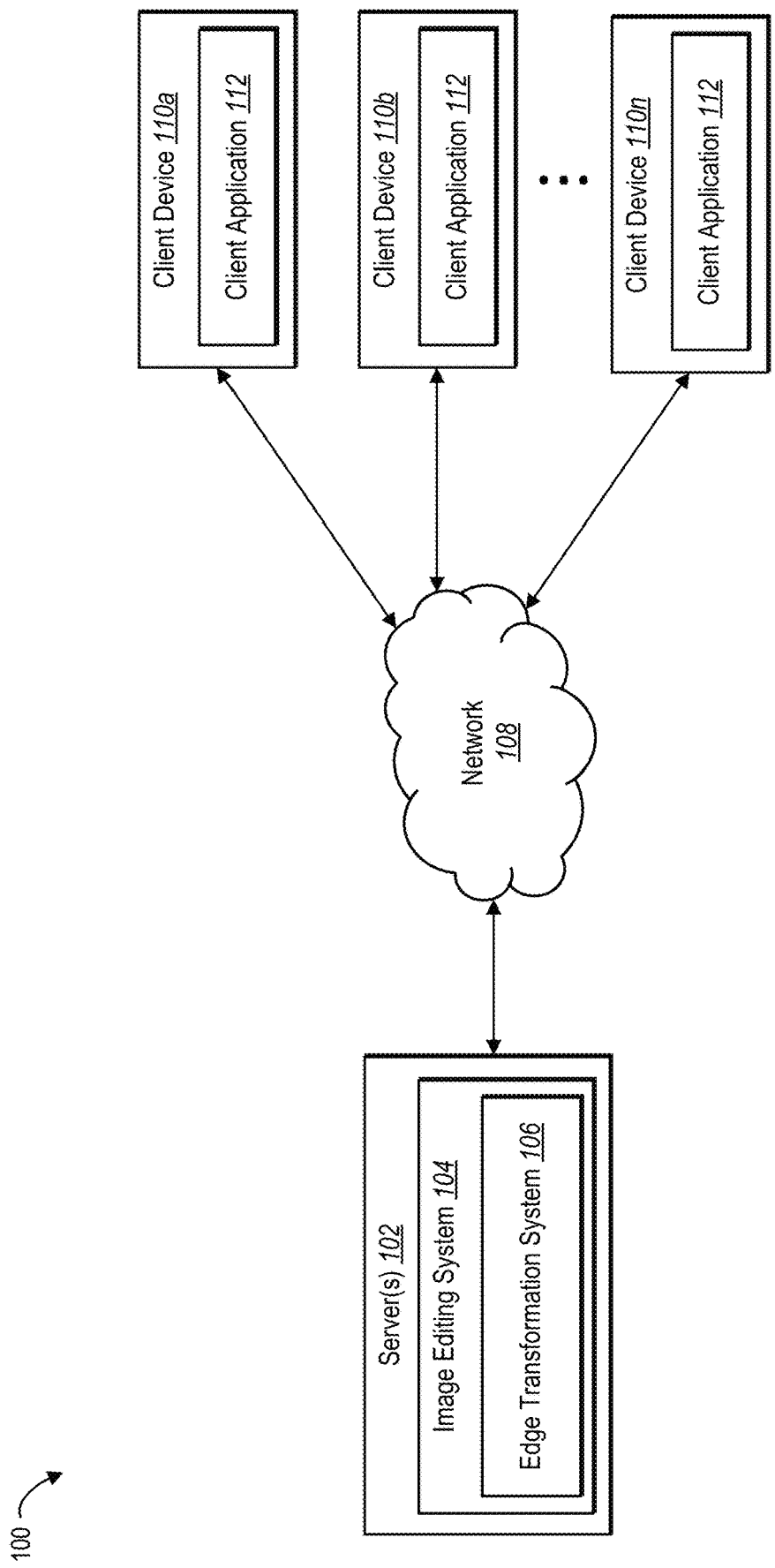
FIG. 1 illustrates an example environment in which an edge transformation system can operate in accordance with one or more embodiments.

One or more embodiments described herein include an edge transformation system that directly manipulates the pixels of edges portrayed in digital images for flexible, precise, and efficient transformation of those edges. For example, in one or more embodiments, the edge transformation system generates a vector spline that comprises anchor points and control points for an edge portrayed in a digital image. The edge transformation system provides the vector spline as a handle associated with the edge. In response to user interactions with the anchor points and control points, the edge transformation system modifies the edge within the digital image. In some implementations, the edge transformation system further modifies one or more regions adjacent to the edge (e.g., influenced regions) simultaneously. For example, in some instances, the edge transformation system generates meshes for the edge and the one or more regions adjacent to the edge and alters the meshes based on the anchor/control point interactions. In some embodiments, the edge transformation system generates a high-density mesh for the edge for more precise control over the changes made to the edge.

To provide an illustration, in one or more embodiments, the edge transformation system determines, from a digital image displayed on a computing device, an edge and an adjacent influenced region comprising pixels proximate to the edge. The edge transformation system also generates an edge-targeting transformation handle for the digital image by determining a vector spline corresponding to the edge. Further, the edge transformation system generates a first mesh corresponding to the edge and a second mesh corresponding to the adjacent influenced region. In response to detecting a user interaction with the edge-targeting transformation handle, the edge transformation system modifies the edge and the adjacent influenced region in the digital image by modifying the first mesh and the second mesh.

As just mentioned, in one or more embodiments, the edge transformation system determines an edge and an adjacent influenced region from a digital image displayed on a computing device. In some embodiments, the edge transformation system determines the edge and adjacent influenced region based on user input provided via a client device. For example, in some cases, the edge transformation system receives a user selection of the edge and the adjacent influenced region. In some embodiments, the edge transformation system determines multiple adjacent influenced regions, such as those on either side of the edge.

As further mentioned above, in one or more embodiments, the edge transformation system generates an edge-targeting transformation handle for the digital image. In particular, the edge transformation system generates the edge-targeting transformation handle by determining a vector spline for the edge. For example, the edge transformation system determines the vector spline based on pixels located in the center of the edge and generates a closed vector spline that outlines the edge. In some instances, the edge transformation system provides the edge-targeting transformation handle for display (e.g., over the digital image) to allow user interaction with the edge-targeting transformation handle via the computing device.

In some implementations, the edge transformation system further generates an additional vector spline for the edge—in addition to the vector spline determined for the edge-targeting transformation handle. For example, in some cases, the edge transformation system generates an additional vector spline that corresponds to an outline of the edge. In one or more embodiments, the edge transformation system generates the additional vector spline so that segments of the additional vector spline that adjoin the adjacent influenced region duplicate the vector geometry of the vector spline determined for the edge-targeting transformation handle.

Further, in some cases, the edge transformation system generates an additional vector spline for one or more adjacent influenced regions. In particular, the edge transformation system generates an additional vector spline that corresponds to an outline of the adjacent influenced region. In one or more embodiments, the edge transformation system generates the additional vector spline for the adjacent influenced region so that segments of the additional vector spline positioned over the edge duplicate the vector geometry of the vector spline determined for the edge-targeting transformation handle.

Additionally, as mentioned above, in one or more embodiments, the edge transformation system generates meshes corresponding to the edge and the adjacent influenced region. For example, in some instances, the edge transformation system generates a mesh for the edge that is bounded within the additional vector spline generated for the edge. Similarly, the edge transformation system generates a mesh for the adjacent influenced region that is bounded within the additional vector spline generated for the adjacent influenced region.

In some implementations, the edge transformation system utilizes meshes of various densities for the edge and the adjacent influenced region. For example, in some instances, the edge transformation system generates a high-density mesh for the edge and a relatively low-density mesh for the adjacent influenced region. Utilizing this approach, the edge transformation system can modify a digital image portraying an edge, while maintaining definition and details corresponding to the edge within the digital image.

Further, as mentioned above, in one or more embodiments, the edge transformation system modifies the edge and the adjacent influenced region within the digital image by modifying the corresponding meshes. In other words, the edge transformation system generates an enhanced digital image. In particular, the edge transformation system modifies the meshes in response to a user interaction with the edge-targeting transformation handle. For example, in some cases, the edge transformation system detects a deformation of the edge-targeting transformation handle that corresponds to the user interaction and modifies the meshes accordingly. In some instances, the edge transformation system modifies the meshes by modifying their corresponding vector splines—the additional vector splines generated for the edge and the adjacent influenced region. In some cases, the edge transformation system modifies the meshes simultaneously.

The edge transformation system provides several advantages over conventional systems. For example, the edge transformation system operates more precisely and accurately than conventional systems. In particular, by adapting transformations to selected edges—rather than transforming edges and surrounding regions the same—the edge transformation system precisely modifies those edges. Indeed, the edge transformation system focuses transformation on the pixels of a determined edge, manipulating those pixels while preserving other characteristics of the edge, such as the overall shape of the edge. Accordingly, the edge transformation system can transform an edge while retaining its natural appearance.

Additionally, the edge transformation system operates more flexibly than conventional systems. Indeed, by generating a transformation handle that specifically targets an edge portrayed in a digital image, the edge transformation system flexibly adapts the transformations implemented by the transformation handle to the edge. In particular, the edge transformation system avoids treating the pixels of the edge the same as the pixels of the surrounding regions as is often done under conventional systems. Accordingly, the edge transformation system can flexibly adjust to a variety of different digital images and implementations portraying a variety of edges, while still generating precise and accurate enhanced digital images.

Further, the edge transformation system operates with improved efficiency compared to conventional systems. In particular, the edge transformation system improves efficiency by offering user interfaces for transforming edges portrayed in digital images with reduced user interaction. Indeed, by generating a user interface with an edge-targeting transformation handle, the edge transformation system can generate enhanced digital images with minimal user interactions (e.g., a single click and drag sequence) while precisely modifying both existing edges and surrounding influenced regions. In other words, the edge transformation system reduces the user interface interactions, time, and computer resources required to generate enhanced digital images with a desired (e.g., natural) visual appearance.

As illustrated by the foregoing discussion, the present disclosure utilizes a variety of terms to describe features and benefits of the edge transformation system. Additional detail is now provided regarding the meaning of these terms. For example, as used herein the term "digital image" refers to a digital visual representation (e.g., an image composed of digital data). In particular, in one or more embodiments, a digital image refers to a digital file that is made of digital image data and can be displayed via a user interface. For example, in one or more embodiments, a digital image includes a digital photo, a digital rendering (e.g., a scan) of a photograph or other document, or a frame of a digital video. In some implementations, a digital image includes a digitally generated drawing, chart, map, graph, logo, etc.

Relatedly, as used herein, the term "enhanced digital image" refers to a modified digital image. In particular, in one or more embodiments, an enhanced digital image refers to a digital image that has been altered through one or more transformations. For example, in some embodiments, an enhanced digital image includes a digital image having an edge and/or adjacent influenced region that has been modified.

As used herein, the term "pixel" refers to an element of a digital image. In particular, in some embodiments, a pixel includes a smallest unit of a digital image that can be displayed or represented (e.g., within a graphical user interface). To illustrate, in some implementations, a pixel includes an element of a digital image that is associated with one or more particular attributes or characteristics (e.g., color, location, etc.). In one or more embodiments, the edge transformation system transforms (e.g., modifies) a digital image by modifying one or more pixels of the digital image.

As used herein, the term "transformation" refers to a modification. In particular, in one or more embodiments, a transformation refers to an alteration or change implemented with regard to at least a portion of a digital image (e.g., pixels within the digital image). For example, in some implementations, a transformation includes a modification that warps, stretches, compresses, re-colors, or moves at least a portion of a digital image. In some implementations, a transformation further includes a modification to one or more digital elements that are associated with a digital image but are not part of the digital image itself. For example, in some embodiments, a transformation includes a modification to a mesh or a vector spline (including a handle generated using a vector spline, such as an edge-targeting transformation handle) that is associated with at least a portion of a digital image.

Additionally, as used herein, the term "edge" refers to a boundary or discontinuity portrayed in a digital image. In particular, in one or more embodiments, an edge refers to a boundary of an object, area, or surface portrayed in a digital image. In one or more embodiments, an edge includes dimensions that span across multiple pixels. For instance, in some implementations, an edge has a width and/or a length that spans across multiple pixels. In some cases, an edge has a uniform width (e.g., uniform thickness). In other words, the width of the edge is the same number of pixels across the entire length of the edge. In some embodiments, an edge has a variable width (e.g., variable thickness). In other words, the width of the edge varies in number of pixels across the length of the edge.

Further, as used herein, the term "adjacent influenced region" refers to a portion of a digital image adjacent to an edge portrayed in the digital image. In particular, in one or more embodiments, an adjacent influenced region includes a portion of a digital image composed of pixels that are proximate to an edge portrayed in the digital image. To illustrate, in some implementations, an adjacent influenced region includes a portion of a digital image that is proximate to an edge portrayed in the digital image and is identified for modification based on one or more modifications made to the edge. In some cases, the proximity of the pixels included in the adjacent influenced region to the edge differs based on various factors, such as direct user input, a pre-established threshold (e.g., a threshold distance), and/or the distance between the edge and an additional edge portrayed in the digital image.

As used herein, the term "edge-targeting transformation handle" refers to an interactive element for modifying an edge portrayed in a digital image. In particular, in one or more embodiments, an edge-targeting transformation handle includes an interactive, visual element displayed over a digital image for modification of an edge portrayed in the digital image. For example, in some implementations, an edge-targeting transformation handle includes a visual element, such as a visual representation of a vector spline, displayed over an edge portrayed in a digital image for modification of that edge via one or more user interactions.

As used herein, the term "vector spline" (or "vector path") refers to a piecewise vector (or path) composed of one or more straight lines and/or curves (referred to as segments). In particular, in one or more embodiments, a vector spline includes a piecewise vector that corresponds to (e.g., approximates) a portion of a digital image. For example, in some implementations, a vector spline includes a piecewise vector that corresponds to an edge and/or an adjacent influenced region portrayed in a digital image. In one or more embodiments, a vector spline is independent of the resolution of the underlying digital image. As used herein, the term "closed vector spline" more particularly refers to a vector spline that corresponds to the outline of a portion of a digital image. For example, in some cases, a closed vector spline includes a vector spline that outlines an edge or an adjacent influenced region portrayed in a digital image.

In some implementations, a vector spline includes one or more anchors and one or more anchor handles. As used herein, the term "anchor" refers a point on at least one segment of a vector spline (that is adjustable). In particular, in one or more embodiments, an anchor includes a point on at least one segment of a vector spline that can be adjusted to modify the at least one segment, such as by modifying the position and/or orientation of the at least one segment. In other words, in some instances, the edge transformation system transforms one or more segments of a vector spline by transforming at least one of the corresponding anchors. In some embodiments, an anchor corresponds to an end of a segment of a vector spline. For example, in some cases, an anchor corresponds to a junction between segments of a vector spline. In some instances, an anchor includes an end of a single segment of a vector spline, such as an end to a segment located at the end of a vector spline. In some implementations, however, an anchor corresponds to other points of a segment of a vector spline, such as the middle of a segment.

As used herein, the term "anchor handle" refers to an interactive element that corresponds to an anchor. In particular, in one or more embodiments, an anchor handle includes an interactive element that controls (e.g., moves) a corresponding anchor based on one or more interactions with the anchor handle. In some implementations an anchor handle controls a corresponding anchor based on one or more direct user interactions with the anchor handle. In some cases, however, an anchor handle controls the corresponding anchor based on one or more user interactions with another anchor handle, such as the anchor handle of a separate vector spline.

Additionally, as used herein, the term "mesh" refers to a collection of polygons corresponding to a region within a digital image. In particular, in one or more embodiments, a mesh includes a collection of polygons consisting of vertices, edges, and areas (e.g., areas bounded by the vertices and edges) that correspond to the shape of a region within a digital image. For example, in some instances, a mesh refers to a collection of polygons that correspond to an edge portrayed in a digital image and/or an adjacent influenced region portrayed in the digital image. In some cases, a mesh consists of triangles. In some instances, a mesh consists of quadrilaterals. In some implementations, a mesh consists of a combination of triangles, quadrilaterals, and/or polygons having additional sides. The edge transformation system can modify pixels of a digital image by detecting changes to a corresponding mesh and mapping pixels from the original mesh to the modified mesh.

As used herein, the term "mesh density" refers to a density of polygons of a mesh. In particular, in one or more embodiments, a mesh density includes the number of polygons included in a mesh that corresponds to a particular region of a digital image. Indeed, in some implementations a mesh having a high mesh density includes a large number of polygons used to define a particular region, and a mesh having a comparatively low mesh density includes a comparatively low number of polygons used to define a region of comparative size.

Further, as used herein, the term "edge detection algorithm" refers to a computer-implemented model or algorithm that detects edges portrayed in a digital image. In particular, in one or more embodiments, an edge detection algorithm includes a computer-implemented algorithm that analyzes at least a portion of a digital image to detect an edge portrayed in the portion of the digital image. For example, in some implementations, an edge detection algorithm includes, but is not limited to, a Canny edge detection algorithm, a Sobel edge detection algorithm, a Prewitt edge detection algorithm, or a Laplacian edge detection algorithm.

Additional detail regarding the edge transformation system will now be provided with reference to the figures. For example, FIG. 1 illustrates a schematic diagram of an exemplary system environment ("environment") 100 in which an edge transformation system 106 can be implemented. As illustrated in FIG. 1, the environment 100 includes a server(s) 102, a network 108, and client devices 110a-110n.

Although the environment 100 of FIG. 1 is depicted as having a particular number of components, the environment 100 can have any number of additional or alternative components (e.g., a different number of servers, client devices, or other components in communication with the edge transformation system 106 via the network 108). Similarly, although FIG. 1 illustrates a particular arrangement of the server(s) 102, the network 108, and the client devices 110a-110n, various additional arrangements are possible.

The server(s) 102, the network, 108, and the client devices 110a-110n may be communicatively coupled with each other either directly or indirectly (e.g., through the network 108 as discussed in greater detail below in relation to FIG. 12). Moreover, the server(s) 102 and the client devices 110a-110n may include a variety of computing devices (including one or more computing devices as discussed in greater detail with relation to FIG. 12).

As mentioned above, the environment 100 includes the server(s) 102. In one or more embodiments, the server(s) 102 generates, stores, receives, and/or transmits data, including digital images and enhanced digital images. For example, in some embodiments, the server(s) 102 receives a digital image from a client device (e.g., one of the client devices 110a-110n) and transmits an enhanced digital image to the client device. In one or more embodiments, the server(s) 102 comprises a data server. In some implementations, the server(s) 102 comprises a communication server or a web-hosting server.

As shown in FIG. 1, the server(s) 102 includes an image editing system 104. In one or more embodiments, the image editing system 104 provides functionality by which client device (e.g., one of the client devices 110a-110n) generates, edits, manages, and/or stores digital images. For example, in some instances, a client device sends a digital image to the image editing system 104 hosted on the server(s) 102 via the network 108. The image editing system 104 then provides many options that the client device may use to edit the digital image, store the digital image, and subsequently search for, access, and view the digital image.

Additionally, the server(s) 102 includes the edge transformation system 106. In particular, in one or more embodiments, the edge transformation system 106 utilizes the server(s) 102 to transform (e.g., modify) the edge of a digital image. For example, in some instances, the edge transformation system 106 utilizes the server(s) 102 to determine an edge and an adjacent influenced region from a digital image and modify the edge and the adjacent influenced region to generate an enhanced digital image.

To illustrate, in one or more embodiments, the edge transformation system 106, via the server(s) 102, determine an edge and an adjacent influenced region from a digital image displayed on a computing device. The edge transformation system 106, via the server(s) 102, further generates an edge-targeting transformation handle for the digital image by determining a vector spline corresponding to the edge. Via the server(s) 102, the edge transformation system 106 generates a first mesh corresponding to the edge and a second mesh corresponding to the adjacent influenced region. Based on a user interaction with the edge-targeting transformation handle, the edge transformation system 106, via the server(s) 102, modifies the edge and the adjacent influenced region in the digital image by modifying the first mesh and the second mesh.

In one or more embodiments, the client devices 110a-110n include computing devices that are capable of displaying and/or modifying digital images. For example, in some implementations, the client devices 110a-110n include at least one of a smartphone, a tablet, a desktop computer, a laptop computer, a head-mounted-display device, or other electronic device. In some instances, the client devices 110a-110n include one or more applications (e.g., the client application 112) that are capable of displaying and/or modifying digital images. For example, in some embodiments, the client application 112 includes a software application installed on the client devices 110a-110n. In other cases, however, the client application 112 includes a web browser or other application that accesses a software application hosted on the server(s) 102.

The edge transformation system 106 can be implemented in whole, or in part, by the individual elements of the environment 100. Indeed, although FIG. 1 illustrates the edge transformation system 106 implemented with regard to the server(s) 102, different components of the edge transformation system 106 can be implemented by a variety of devices within the environment 100. For example, one or more (or all) components of the edge transformation system 106 can be implemented by a different computing device (e.g., one of the client devices 110a-110n) or a separate server from the server(s) 102 hosting the image editing system 104. Example components of the edge transformation system 106 will be described below with regard to FIG. 10.

Figure 2:
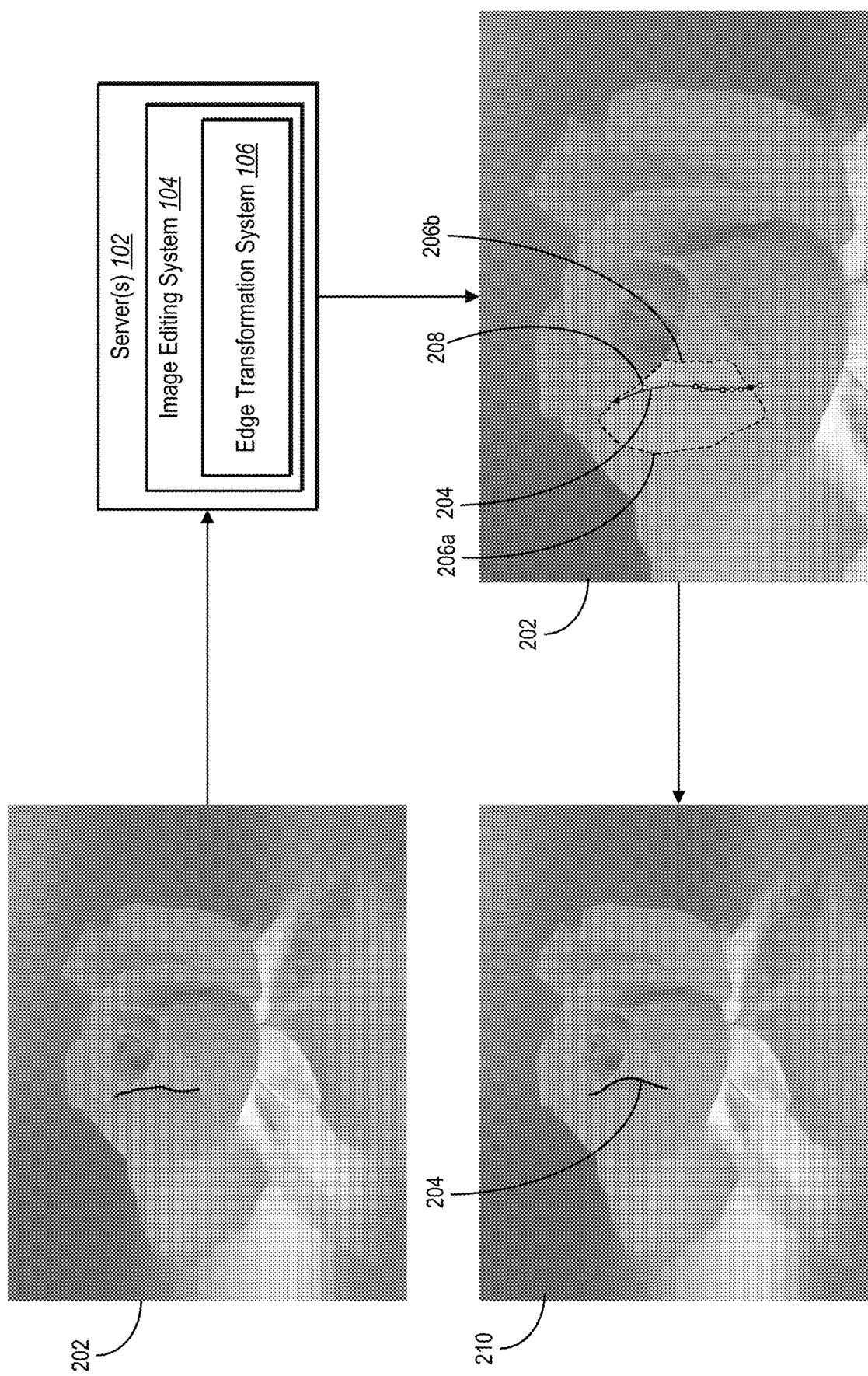
FIG. 2 illustrates an overview diagram of the edge transformation system modifying an edge portrayed in a digital image in accordance with one or more embodiments.

As mentioned above, the edge transformation system 106 generates enhanced digital images. In particular, in one or more embodiments, the edge transformation system 106 generates an enhanced digital image by modifying an edge portrayed in a digital image. FIG. 2 illustrates an overview diagram of the edge transformation system 106 modifying an edge portrayed in a digital image in accordance with one or more embodiments.

As shown in FIG. 2, the edge transformation system 106 determines a digital image 202. In one or more embodiments, the edge transformation system 106 determines the digital image 202 by receiving the digital image 202 from a computing device (e.g., a client device). In some embodiments, the edge transformation system 106 determines the digital image 202 by accessing a database that stores digital images. For example, in some implementations, the edge transformation system 106 maintains a database that stores digital images for subsequent access. In some instances, the edge transformation system 106 receives or retrieves the digital image 202 from another platform (e.g., a third-party system) that provides access to digital images. Though not shown in FIG. 2, in one or more embodiments, the digital image 202 is displayed on a computing device (e.g., the edge transformation system 106 provides the digital image 202 for display on the computing device).

As further shown in FIG. 2, the edge transformation system 106 determines (e.g., identifies) an edge 204 portrayed in the digital image. Additionally, the edge transformation system 106 determines (e.g., identifies) adjacent influenced regions 206a-206b. Though FIG. 2 illustrates the edge transformation system 106 determining a particular number of adjacent influenced regions, it should be noted that the edge transformation system 106 can determine various numbers of adjacent influenced regions in various embodiments. Indeed, in some cases, the edge transformation system 106 determines a single adjacent influenced region. In some instances, however, the edge transformation system 106 determines more than two adjacent regions. In at least one implementation, the edge transformation system 106 determines a number of adjacent influenced regions that corresponds to the number of portions of the digital image that are adjacent to the determined edge.

Additionally, as shown in FIG. 2, the edge transformation system 106 generates an edge-targeting transformation handle 208 for the digital image 202. In particular, in one or more embodiments, the edge transformation system 106 generates the edge-targeting transformation handle 208 by determining a vector spline for the edge 204. Determining the vector spline for an edge will be discussed in more detail below with reference to FIGS. 4A-4C. As will be further discussed below, in some cases, the edge transformation system 106 also generates meshes and additional vector splines for the edge 204 and the adjacent influenced regions 206a-206b.

As further illustrated by FIG. 2, the edge transformation system 106 generates the enhanced digital image 210. In particular, in one or more embodiments, the edge transformation system 106 generates the enhanced digital image 210 by modifying the edge 204 based on a user interaction with the edge-targeting transformation handle 208 (e.g., a user interaction received via the computing device displaying the digital image 202). For example, in some embodiments, the edge transformation system 106 detects a user interaction that transforms the edge-targeting transformation handle 208 and modifies the edge 204 using a corresponding transformation. In some cases, the edge transformation system 106 further modifies the adjacent influenced regions 206a-206b based on the user interaction with the edge-targeting transformation handle 208. As will be discussed in more detail below, in some implementations, the edge transformation system 106 modifies the edge 204 and the adjacent influenced regions 206a-206b by modifying the additional vector splines and the meshes corresponding to the edge 204 and the adjacent influenced regions 206a-206b.

As shown in FIG. 2, the enhanced digital image 210 includes the modified edge 204 that appears consistent with the digital image 202 but is in a different location and orientation. In particular, the modified edge 204 has an additional curved appearance, thus making the rose look more elegant. In generating the modified edge 204, the edge transformation system 106 maintains the natural appearance of the surrounding regions, so that the rose continues to appear natural and realistic. Thus, the edge transformation system 106 generates the enhanced digital image 210 with a modified edge and surrounding regions with a minimal number of user interactions (e.g., a click and drag of one or more anchors the edge-targeting transformation handle 208).

Figure 3:
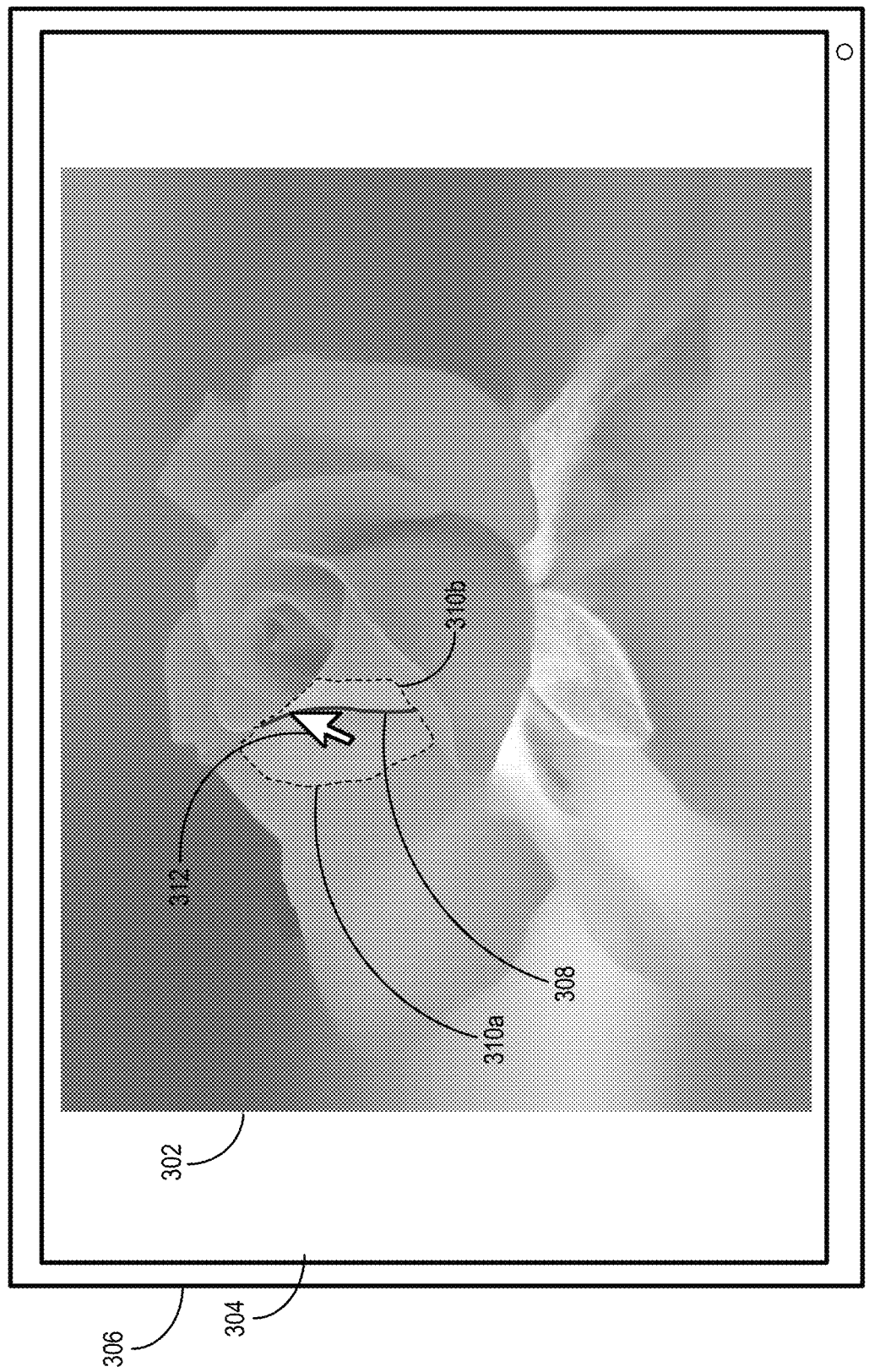
FIG. 3 illustrates a digital image having an edge and adjacent influenced regions in accordance with one or more embodiments.

As discussed above, in one or more embodiments, the edge transformation system 106 determines an edge and one or more influenced regions from a digital image displayed on a computing device. FIG. 3 illustrates a digital image having an edge and adjacent influenced regions in accordance with one or more embodiments.

As shown in FIG. 3, the edge transformation system 106 provides a digital image 302 within a graphical user interface 304 displayed on a computing device 306. Further, the edge transformation system 106 determines the edge 308 and the adjacent influenced regions 310a-310b. In particular, the adjacent influenced regions 310a includes a portion of the digital image 302 on one side of the edge 308, and the adjacent influenced region 310b includes a portion of the digital image 302 on another side of the edge 308.

In one or more embodiments, the edge transformation system 106 determines the edge 308 based on a user interaction with the edge 308. For example, in some implementations, the edge transformation system 106 detects a user interaction (e.g., via the cursor 312) that selects the edge 308 within the digital image 302. In some implementations, the edge transformation system 106 determines the edge 308 utilizing an edge detection algorithm. To illustrate, in some instances, the edge transformation system 106 utilizes the edge detection algorithm to identify all edges within the digital image 302 and highlights or otherwise visually distinguishes the edges for user selection via the cursor 312. In at least one embodiment, the edge transformation system 106 detects that the cursor 312 is proximate to (e.g., hovering over) the edge 308 and determines that the edge 308 is the closest edge to the cursor 312. Accordingly, the edge transformation system 106 highlights or otherwise visually distinguishes the edge 308 as a suggestion for selection.

As illustrated in FIG. 3, in some embodiments, the edge transformation system 106 provides a visual representation of the edge 308 for display on the computing device 306. In particular, the edge transformation system 106 provides a visual representation over the digital image 302 (e.g., over the edge 308). For instance, the edge transformation system 106 highlights or otherwise visually distinguishes the edge 308 to indicate that the edge 308 is selected.

In some embodiments, the edge transformation system 106 determines the adjacent influenced regions 310a-310b based on one or more user interactions with the digital image 302. For example, in some implementations, the edge transformation system 106 detects one or more user interactions (e.g., via the cursor) that define the adjacent influenced regions 310a-310b. To illustrates, in some cases, the edge transformation system 106 detects one or more user interactions that draw or otherwise outline the boundaries of the adjacent influenced regions 310a-310b within the digital image 302.

In some cases, the edge transformation system 106 determines the adjacent influenced regions 310a-310b by selecting a set of pixels that are within a threshold distance from the edge 308. Indeed, in some implementations, the edge transformation system 106 utilizes a threshold distance to detect an outer edge of the adjacent influenced regions 310a-310b. For example, in some instances, the edge transformation system 106 selects all pixels that are within a threshold distance of any point of the edge 308 (e.g., any pixel of the edge 308). In some implementations, the edge transformation system 106 selects pixels within a threshold distance of the center of the edge 308. In some cases, the edge transformation system 106 selects pixels within a threshold distance of the outer limit of the edge 308 (e.g., selects a pixel within a threshold distance of the outer limit that is closest to that pixel). In one or more embodiments, the edge transformation system 106 adjusts the threshold distance used to determine the adjacent influenced regions 310a-310b based on user input received via the computing device 306.

Though not shown in FIG. 3, in one or more embodiments, the edge transformation system 106 determines an adjacent influenced region by selecting a region of the digital image that is bounded by the edge determined for transformation and an additional edge that is nearest to that edge. To illustrate, in some implementations, upon selection of an edge within a digital image for transformation of the edge, the edge transformation system 106 identifies one or more additional edges on one or more sides of the edge selected for transformation. In particular, the edge transformation system 106 identifies those edges that are closest to the edge selected for transformation on at least one side of that selected edge. Accordingly, the edge transformation system 106 determines that the portions of the digital image between the selected edge and the other nearest edges are adjacent influenced regions.

As illustrated in FIG. 3, in some embodiments, the edge transformation system 106 provides visual representations of the adjacent influenced regions 310a-310b for display on the computing device 306. In particular, the edge transformation system 106 provides visual representations over the digital image 302 (e.g., over the adjacent influenced regions 310a-310b). For instance, the edge transformation system 106 highlights or otherwise visually distinguishes the adjacent influenced regions 310a-310b (e.g., outlines of the adjacent influenced regions 310a-310b or the entirety of the adjacent influenced regions 310a-310b). The edge transformation system 106 can modify one or more of the adjacent influenced regions based on user interactions (e.g., modification of one of the borders after the adjacent influenced regions 310a-310b are provided for display).

Figure 4A:
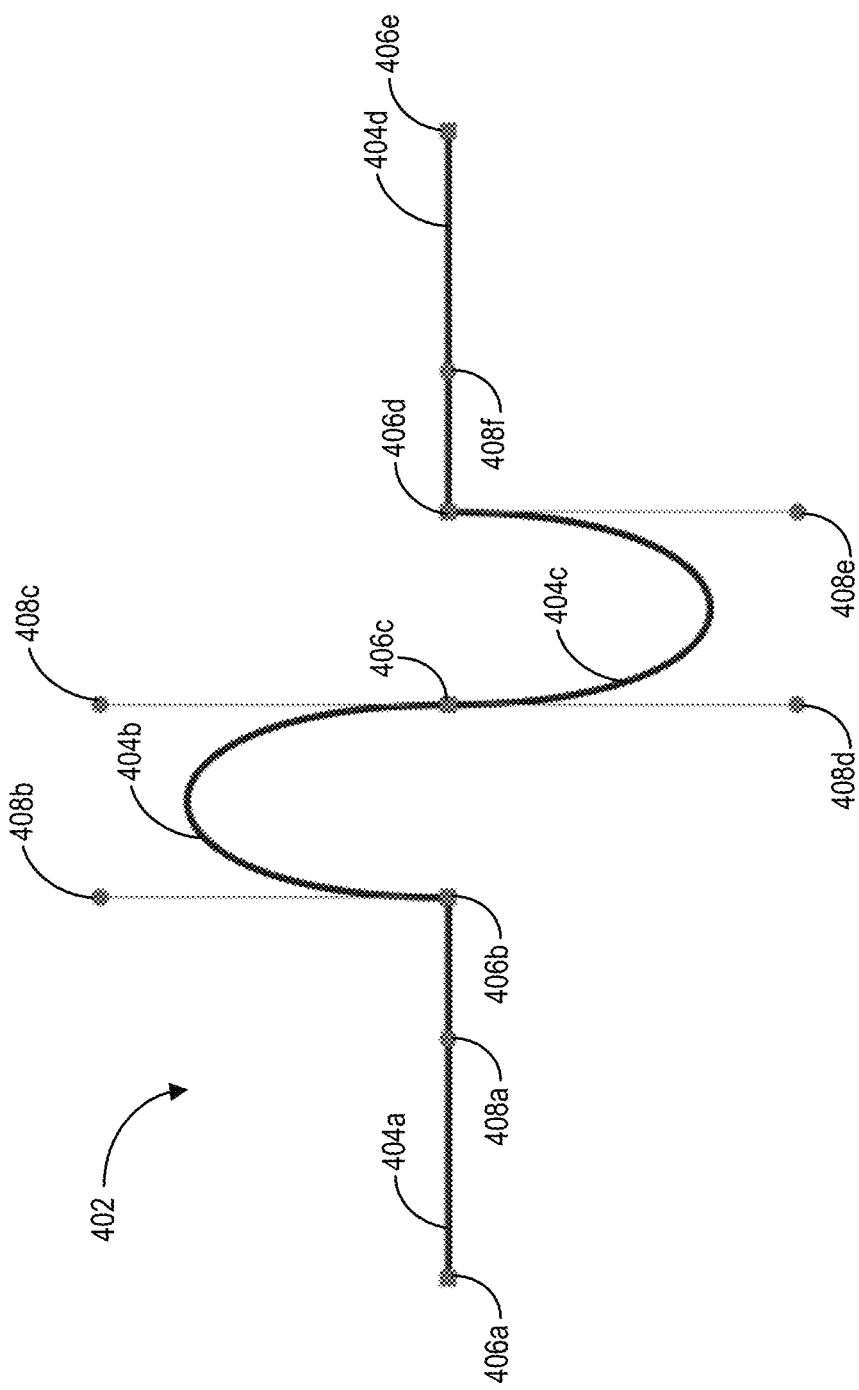
FIG. 4A illustrates determining a vector spline in accordance with one or more embodiments.
Figure 4B:
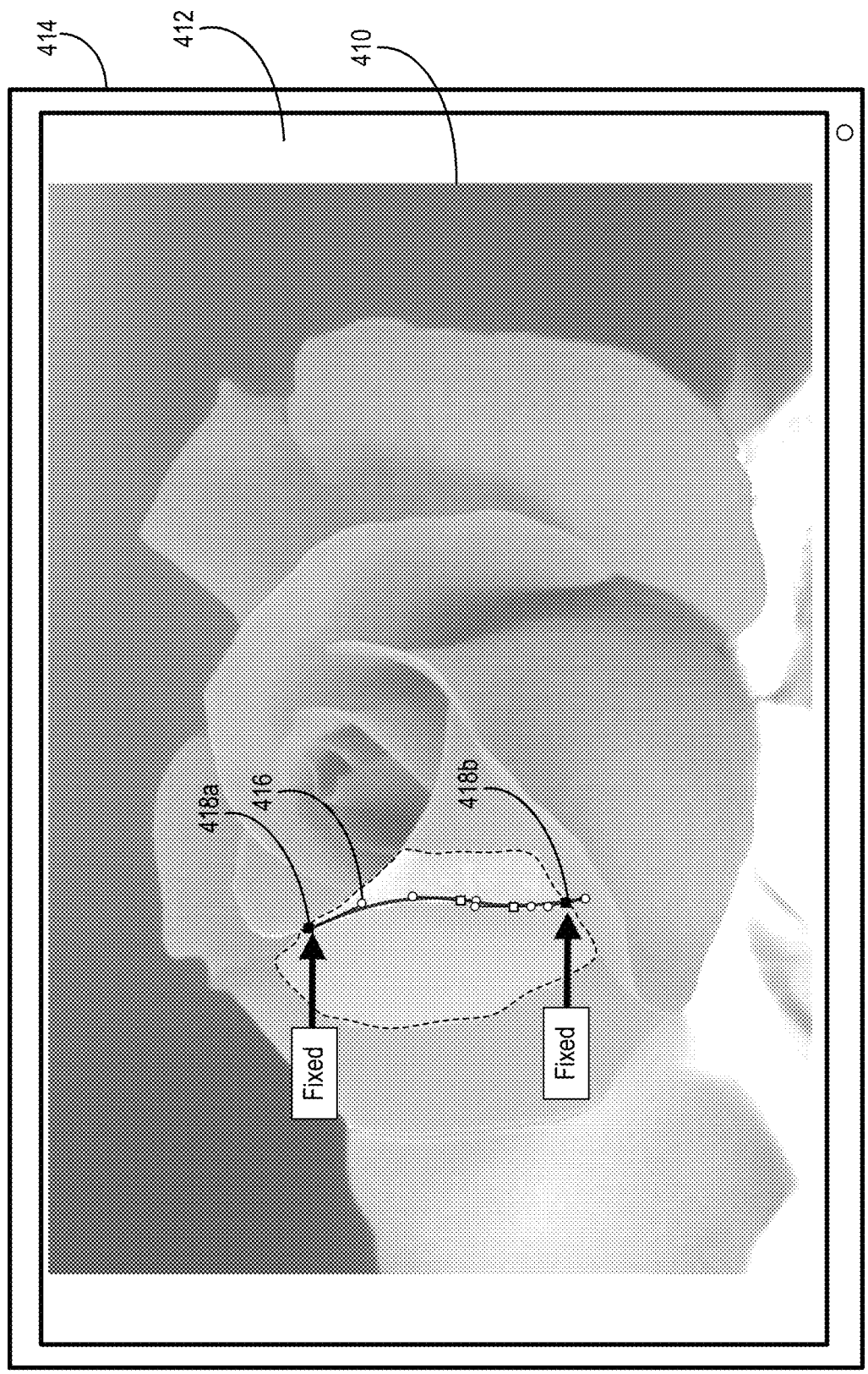
FIG. 4B illustrates providing a vector spline corresponding to an edge selected for transformation as an edge-targeting transformation handle in accordance with one or more embodiments.

As discussed above, in one or more embodiments, the edge transformation system 106 generates an edge-targeting transformation handle for an edge selected for transformation. In particular, the edge transformation system 106 generates the edge-targeting transformation handle by determining a vector spline corresponding to the edge. FIGS. 4A-4C illustrate determining a vector spline corresponding to an edge selected for transformation in accordance with one or more embodiments.

In particular, FIG. 4A illustrates determining a vector spline 402 in accordance with one or more embodiments. As shown in FIG. 4A, the edge transformation system 106 determines the vector spline 402 by generating a plurality of segments 404a-404d. Additionally, the edge transformation system 106 generates a plurality of anchors 406a-406e corresponding to the ends of the segments 404a-404d.

Further, as shown, the edge transformation system 106 generates a plurality of anchor handles 408a-408f. In some embodiments, the edge transformation system 106 generates an anchor handle for each anchor of a vector spline. In some instances, the edge transformation system 106 generates an anchor handle for each of a subset of the anchors of the vector spline. In at least one implementation, the edge transformation system 106 generates multiple anchor handles for a corresponding anchor. To illustrate, in one or more embodiments, the edge transformation system 106 generates the anchor handles 408a, 408c, and 408e to modify a position of the anchors 406b, 406c, and 406d, respectively (e.g., to modify the position of the segments associated with the anchors 406b, 406c, and 406d). Further, the edge transformation system 106 generates the anchor handles 408b, 408d, and 408f to modify an orientation of the anchors 406b, 406c, and 406d, respectively (e.g., to modify the orientation of the segments associated with the anchors 406b, 406c, and 406d).

Though FIG. 4A illustrates the vector spline 402 having a particular path from one end to the other, it should be noted that the vector spline 402 is merely exemplary. In one or more embodiments, the edge transformation system 106 generates a vector spline based on the corresponding edge selected for transformation. In particular, in some cases, the edge transformation system 106 generates the vector spline so that a path from one end of the vector spline to the other end corresponds to a path indicated by the edge selected for transformation. For example, in some implementations, the edge transformation system 106 generates the segments of a vector spline so that the path from a first segment of the vector spline to a final segment of the vector spline corresponds to (e.g., matches or approximates) the path indicated by the edge. Indeed, as will be discussed in more detail, in one or more embodiments, the edge transformation system 106 generates the segments of the vector spline so that the path corresponds to a path indicated by pixels associated with the edge, such as pixels located in the center of the edge or pixels corresponding to an outline of the edge.

In one or more implementations, the edge transformation system 106 utilizes an edge detection algorithm to determine edge data associated with an edge. Accordingly, the edge transformation system 106 generates the vector spline based on the edge data. Further, as will be discussed in more detail below, in some cases, the edge transformation system 106 further generates additional vector splines for the edge and for the one or more adjacent influenced regions that are associated with the edge.

FIG. 4B illustrates providing a vector spline corresponding to an edge selected for transformation as an edge-targeting transformation handle 416 in accordance with one or more embodiments. As shown in FIG. 4B, the edge transformation system 106 provides a digital image 410 for display within a graphical user interface 412 of a computing device 414. As further shown in FIG. 4B, the edge transformation system 106 provides the edge-targeting transformation handle 416 for display on the computing device 414 over the digital image 410.

As illustrated in FIG. 4B, and as indicated above with reference to FIG. 4A, the edge transformation system 106 generates the edge-targeting transformation handle 416 (e.g., determines the vector spline) based on the edge from the digital image 410 that has been selected for transformation. For instance, as shown in FIG. 4B, the edge transformation system 106 generates the edge-targeting transformation handle 416 so that the path from the anchor 418a corresponding to one end of the edge-targeting transformation handle 416 to the anchor 418b corresponding to the other end corresponds to the path indicated by the edge.

In particular, as shown in FIG. 4B, the edge transformation system 106 generates the edge-targeting transformation handle 416 based on the center of the edge. Indeed, in some implementations, the edge transformation system 106 generates the edge-targeting transformation handle 416 based on pixels located in the center of the edge. For example, in at least one implementation, the edge transformation system 106 identifies each pixel located in the center of the edge across the entire length of the edge. Accordingly, the edge transformation system 106 generates the edge-targeting transformation handle 416 based on those pixels located in the center of the edge. For instance, in some cases, the edge transformation system 106 generates the segments of the edge-targeting transformation handle 416 so that the path from the anchor 418a corresponding to one end of the edge-targeting transformation handle 416 to the anchor 418b corresponding to the other end corresponds to the path indicated by the pixels located in the center.

As further shown in FIG. 4B, the edge transformation system 106 fixes the anchors 418a-418b corresponding to the ends of the edge-targeting transformation handle 416. In particular, the edge transformation system 106 fixes the anchors 418a-418b so that the anchors 418a-418b are unavailable for modification (e.g., user interactions with the anchor handles corresponding to the anchors 418a-418b do not modify the anchors 418a-418b). By fixing the anchors 418a-418b, the edge transformation system 106 prevents one or more pixels proximate to the ends of the edge-targeting transformation handle, such as those pixels that are unassociated with the edge selected for transformation or the adjacent influenced region(s). Indeed, the edge transformation system 106 prevents, from modification, those pixels that are beyond the limits of the edge and adjacent influenced region(s). In other words, the edge transformation system 106 confines the transformations applied to the digital image to those portions of the digital image that have been determined (e.g., selected) for modification.

In one or more embodiments, the edge transformation system 106 generates an edge-targeting transformation handle for an edge by determining a closed vector spline that outlines the edge. FIG. 4C illustrates an edge-targeting transformation handle 420 that includes a closed vector spline that outlines an edge 424 selected for transformation in accordance with one or more embodiments.

As shown in FIG. 4C, the edge 424 corresponding to the edge-targeting transformation handle 420 has a variable thickness. In particular, the thickness of the middle portion of the edge 424 is greater than the thickness of the end portions of the edge 424. Indeed, in one or more embodiments, the edge transformation system 106 generates an edge-targeting transformation handle for an edge having a variable thickness by determining a closed vector spline for the edge.

To illustrate, in one or more embodiments, the edge transformation system 106 determines whether an edge selected for transformation has a variable thickness. For example, in some cases, the edge transformation system 106 determines the width (e.g., in pixels) of the edge at various portions of the edge, such as the widths 422a-422b of the edge 424. The edge transformation system 106 compares the widths and determines that the edge has a variable thickness when at least two of the widths are different. In some implementations, the edge transformation system 106 determines a closed vector spline for the edge only if the difference in widths exceeds some threshold.

Further, as mentioned above and as shown in FIG. 4C, the edge-targeting transformation handle 420 outlines the corresponding edge 424. Indeed, in one or more embodiments, the edge transformation system 106 determines a closed vector spline for the edge-targeting transformation handle 420 corresponding to the edge 424 based on pixels that are associated with the outline (e.g., outer limits) of the edge 424.

Though not shown in FIG. 4C, in some implementations, the edge transformation system 106 determines a closed vector spline for an edge having a width that exceeds a threshold width. Indeed, in some cases, even where the width of the edge is uniform across the length of the edge, the edge transformation system 106 determines a closed vector spline for the edge if the width exceeds a threshold width. For example, in some instances, the edge transformation system 106 applies a threshold width to pixels located in the center of the edge to determine whether the width of the edge exceeds the threshold width. Based on determining that the width of the edge exceeds the threshold width, the edge transformation system 106 generates an edge-targeting transformation handle by determining a closed vector spline that corresponds to an outline of the edge.

In one or more embodiments, when generating a closed vector spline for use as an edge-targeting transformation handle, the edge transformation system 106 fixes segments of the closed vector spline that do not adjoin an adjacent influenced region. Further, the edge transformation system 106 duplicates, for the segments of the closed vector spline that are positioned between the edge and an adjacent influenced region, the anchor geometry of the adjacent influenced region to facilitate transformation of the adjacent influenced region in response to a user interaction of the edge-targeting transformation handle.

Thus, in one or more embodiments, the edge transformation system 106 generates an edge-targeting transformation handle that targets an edge portrayed in a digital image for transformation. In particular, the edge transformation system 106 generates the edge-targeting transformation handle by determining a vector spline that corresponds to the edge. Accordingly, in some embodiments, the algorithm and acts described with reference to FIGS. 4A-4C comprise the corresponding structure for performing a step for generating an edge-targeting transformation handle corresponding to the edge and the adjacent influenced region.

By generating an edge-targeting transformation handle that corresponds to an edge portrayed in a digital image, the edge transformation system 106 operates more flexibly than conventional systems. In particular, by utilize a transformation handle that targets an edge, the edge transformation system 106 applies transformations that are flexibly adapted to the pixels of the edge. Indeed, the edge transformation system 106 avoids utilizing the same tools that have been crafted to manipulate the pixels associated with other portions of a digital image as is often required under conventional systems.

Further, the edge transformation system 106 operates more precisely than conventional systems. Indeed, because the edge transformation system 106 adapts transformations to a selected edge, the edge transformation system 106 transforms the edge more precisely. For example, the edge transformation system 106 can manipulated pixels associated with the selected edge while preserving other characteristics, such as the overall shape of the edge. Accordingly, the edge transformation system 106 avoids altering the edge more than desired.

Figure 5:
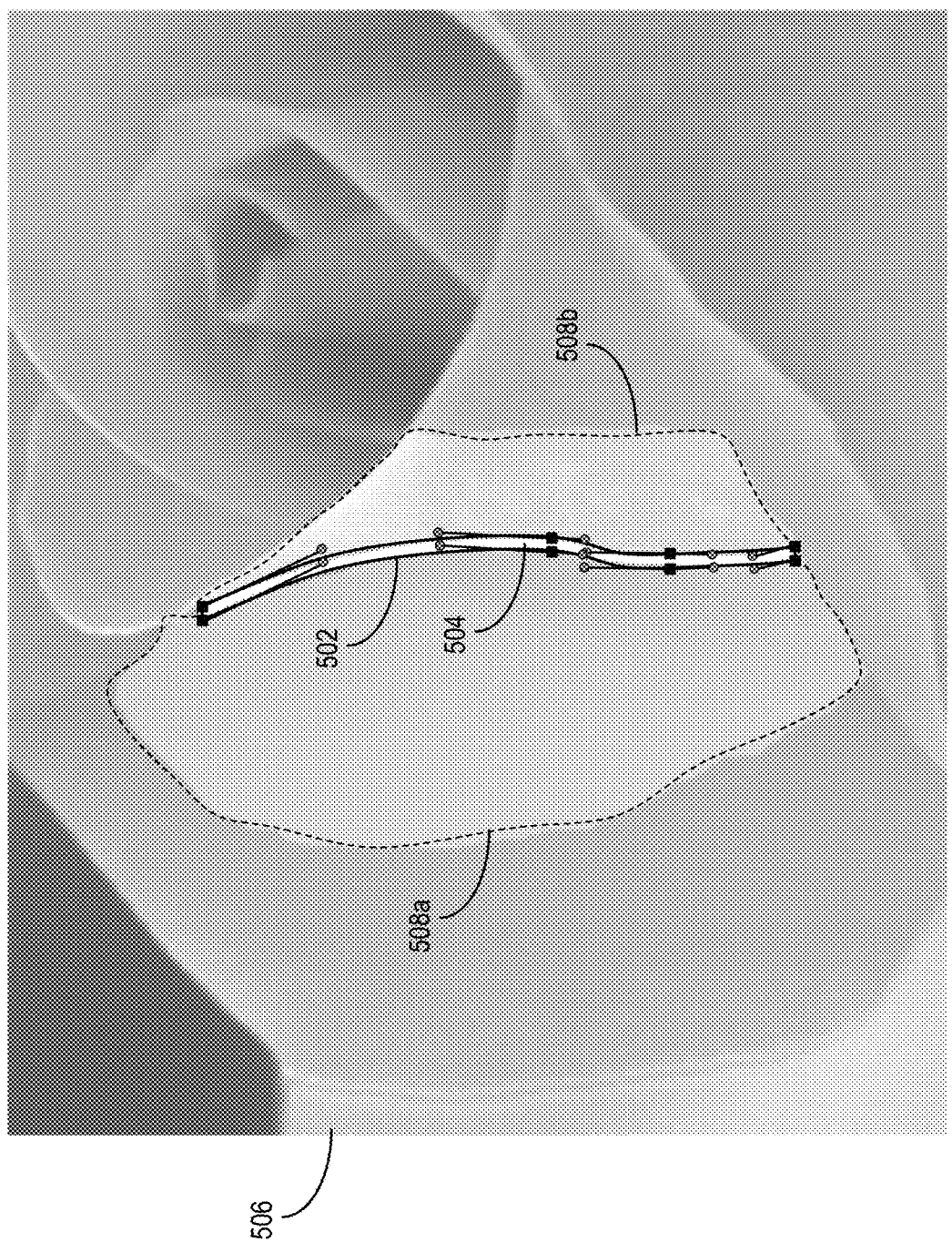
FIG. 5 illustrates an additional vector spline corresponding to an edge in accordance with one or more embodiments.

As mentioned above, in one or more embodiments, the edge transformation system 106 further generates an additional vector spline corresponding to the edge selected for transformation. FIG. 5 illustrates an additional vector spline 502 corresponding to an edge 504 in accordance with one or more embodiments. In particular, as shown in FIG. 5, the edge transformation system 106 generates the additional vector spline 502 corresponding to an outline of the edge 504 of the digital image 506. In other words, the additional vector spline 502 includes a closed vector spline.

In some implementations, the edge transformation system 106 generates the additional vector spline 502 based on pixels that are associated with the outline (e.g., outer limits/border) of the edge 504. For example, the edge transformation system 106 detects pixels of the digital image 506 that are associated with the border of the edge 504. Accordingly, the edge transformation system 106 generates the additional vector spline 502 based on those pixels. In some cases, however, the edge transformation system 106 generates the additional vector spline 502 based on an offset of the center of the edge 504. For example, in some cases, the edge transformation system 106 detects pixels of the digital image 506 that are located in the center of the edge 504. The edge transformation system 106 further utilizes an offset width to determine offset pixels on either side of those pixels located in the center of the edge 504. Accordingly, the edge transformation system 106 generates the additional vector spline 502 based on those offset pixels.

In some implementations, the edge transformation system 106 generates the additional vector spline 502 so that portions of the additional vector spline 502 that adjoin the adjacent influenced regions 508a-508b include a vector geometry that corresponds to the vector geometry of the edge-targeting transformation handle (not shown) generated for the edge 504. For example, in some implementations, the edge transformation system 106 generates the additional vector spline 502 so that the segments adjoining the adjacent influenced regions 508a-508b have the same vector geometry as the edge-targeting transformation handle generated for the edge 504.

Figure 6:
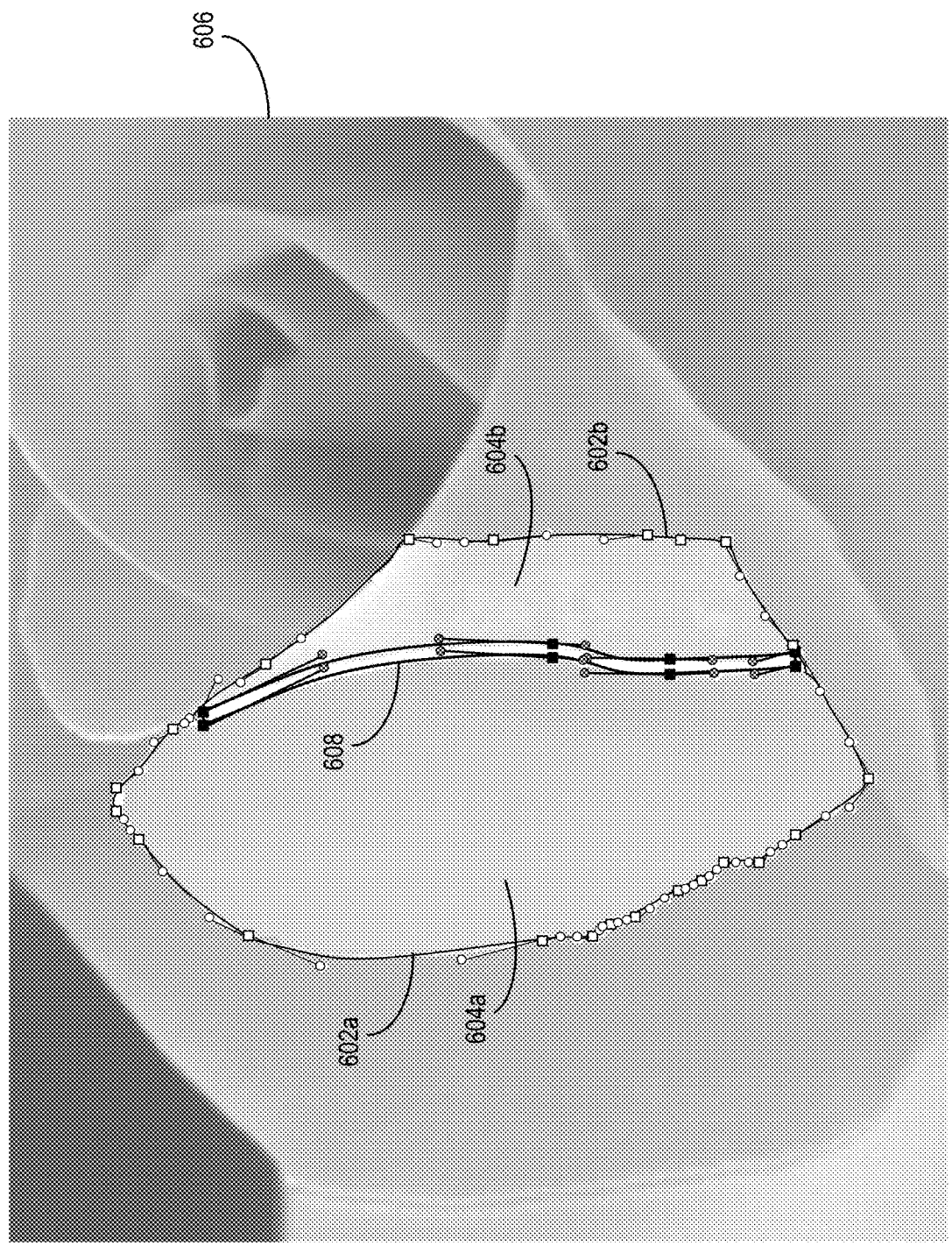
FIG. 6 illustrates additional vector splines corresponding to adjacent influenced regions in accordance with one or more embodiments.

As further mentioned above, in one or more embodiments, the edge transformation system 106 generates additional vector splines for the adjacent influenced regions corresponding to an edge selected for transformation. FIG. 6 illustrates additional vector splines 602a-602b corresponding to adjacent influenced regions 604a-604b in accordance with one or more embodiments. In particular, as shown in FIG. 6, the edge transformation system 106 generates the additional vector splines 602a-602b corresponding to outlines of the adjacent influenced regions 604a-604b of the digital image 606, respectively. In other words, the additional vector splines 602a-602b include closed vector splines. Accordingly, in some implementations, the edge transformation system 106 generates the additional vector splines 602a-602b based on pixels that are associated with the outlines (e.g., outer limits) of the adjacent influenced regions 604a-604b.

In one or more embodiments, the additional vector splines 602a-602b further correspond to an outline of the edge 608. For example, in some implementations, segments of the additional vector spline 602a-602b are adjacent to the edge 608. In some cases, the additional vector splines 602a-602b include segments that are positioned over the edge 608 (are positioned over pixels that are associated with the edge 608).

In some implementations, the edge transformation system 106 generates the additional vector splines 602a-602b so that portions of the additional vector splines 602a-602b positioned over the edge 608 selected for transformation include a vector geometry that corresponds to the vector geometry of the edge-targeting transformation handle (not shown) generated for the edge 608. For example, in some implementations, the edge transformation system 106 generates the additional vector splines 602a-602b so that the segments positioned over the edge 608 have the same vector geometry as the edge-targeting transformation handle generated for the edge 608. Accordingly, in some implementations, the edge transformation system 106 generates the additional vector splines 602a-602b so that anchor geometry of the segments positioned over the edge 608 corresponds to the vector geometry of the edge-targeting transformation handle generated for the edge 608 (and the additional vector spline generated for the edge 608).

To provide a more cohesive example, in one or more embodiments, the edge transformation system 106 generates an edge-targeting transformation handle for an edge portrayed in a digital image. In some cases, the edge transformation system 106 generates the edge-targeting transformation handle by determining a vector spline based on pixels located in the center of the edge. In some instances, however, the edge transformation system 106 generates the edge-targeting transformation handle by determining a closed vector spline that outlines the edge. In either case, the edge transformation system 106 generates the edge-targeting transformation handle by generating a plurality of segments for the vector spline, a plurality of anchors corresponding to the segments, and a plurality of anchor handles corresponding to the anchors.

Additionally, the edge transformation system 106 generates an additional vector spline for the edge portrayed in the digital image. In particular, the edge transformation system 106 generates the additional vector spline to correspond to an outline of the edge. For example, in some implementations, the edge transformation system 106 generates the additional vector spline based on pixels associated with the border/outline of the edge. In some cases, the edge transformation system 106 generates the additional vector spline based on an offset of pixels located in the center of the edge (e.g., based on an offset of the edge-targeting transformation handle corresponding to the center of the edge). In at least one implementation, the edge transformation system 106 generates the additional vector spline by generating a plurality of segments, a plurality of corresponding anchors, and a plurality of anchor handles corresponding to the anchors.

In some implementations, the edge transformation system 106 aligns at least some of the segments, anchors, and anchor handles of the additional vector spline for the edge with the segments, anchors, and anchor handles of the edge-targeting transformation handle. For example, in some cases, the edge transformation system 106 aligns those segments of the additional vector spline (and the corresponding anchors and anchor handles) that adjoin the adjacent influenced region(s) to those segments (and the corresponding anchors and anchor handles) of the edge-targeting transformation handle. Accordingly, as the segments of the edge-targeting transformation handle are transformed via user interaction, the edge transformation system 106 can transform the aligned segments of the additional vector spline for the edge in the same manner. For instance, in some cases, the edge transformation system 106 maps anchor handles of the additional vector spline for the edge to the anchor handles of the edge-targeting transformation handle to which those anchor handles are aligned. Thus, when a user interaction interacts with a particular anchor handle of the edge-targeting transformation handle, the edge transformation system 106 identifies the aligned anchor handle of the additional vector spline and transforms the additional vector spline by controlling the aligned anchor handle based on the user interaction.

Further, the edge transformation system 106 generates an additional vector spline for the adjacent influenced region that is proximate to the edge portrayed in the digital image. In particular, the edge transformation system 106 generates an additional vector spline that corresponds to an outline of the adjacent influenced region. In at least one implementation, the edge transformation system 106 generates the additional vector spline for the adjacent influenced region by generating a plurality of segments, a plurality of corresponding anchors, and a plurality of anchor handles corresponding to the anchors. In one or more implementations, some of the segments of the additional vector spline overlap with the edge. For example, in some cases, some of the segments of the additional vector spline overlap with segments of the additional vector spline that corresponds to the outline of the edge. In some instances, however, some of the segments of the additional vector spline for the adjacent influenced region merely adjoin (e.g., are positioned next to) the edge.

Similar to the additional vector spline for the edge, in one or more embodiments, the edge transformation system 106 aligns at least some of the segments, anchors, and anchor handles of the additional vector spline for the adjacent influenced region with the segments, anchors, and anchor handles of the edge-targeting transformation handle. For example, in some cases, the edge transformation system 106 aligns those segments of the additional vector spline for the adjacent influenced region (and the corresponding anchors and anchor handles) that overlap or adjoin the edge to those segments (and the corresponding anchors and anchor handles) of the edge-targeting transformation handle. Accordingly, as the segments of the edge-targeting transformation handle are transformed via user interaction, the edge transformation system 106 can transform the aligned segments of the additional vector spline for the adjacent influenced region in the same manner. For instance, in some cases, the edge transformation system 106 maps anchor handles of the additional vector spline for the adjacent influenced region to the anchor handles of the edge-targeting transformation handle to which those anchor handles are aligned. Thus, when a user interaction interacts with a particular anchor handle of the edge-targeting transformation handle, the edge transformation system 106 identifies the aligned anchor handle of the additional vector spline for the adjacent influenced region and transforms the additional vector spline by controlling the aligned anchor handle based on the user interaction.

In one or more embodiments, by aligning the segments, anchors, and anchor handles of the additional vector spline for the adjacent influenced region with the segments, anchors, and anchor handles of the edge-targeting transformation handle, the edge transformation system 106 also aligns the segments, anchors, and anchor handles of the additional vector spline for the adjacent influenced region with the segments, anchors, and anchor handles of the additional vector spline for the edge. Thus, the edge transformation system 106 duplicates the vector geometry and the anchor geometry associated with the edge-targeting transformation system 106 when generating the additional vector splines for the edge and the adjacent influenced region.

Figure 7:
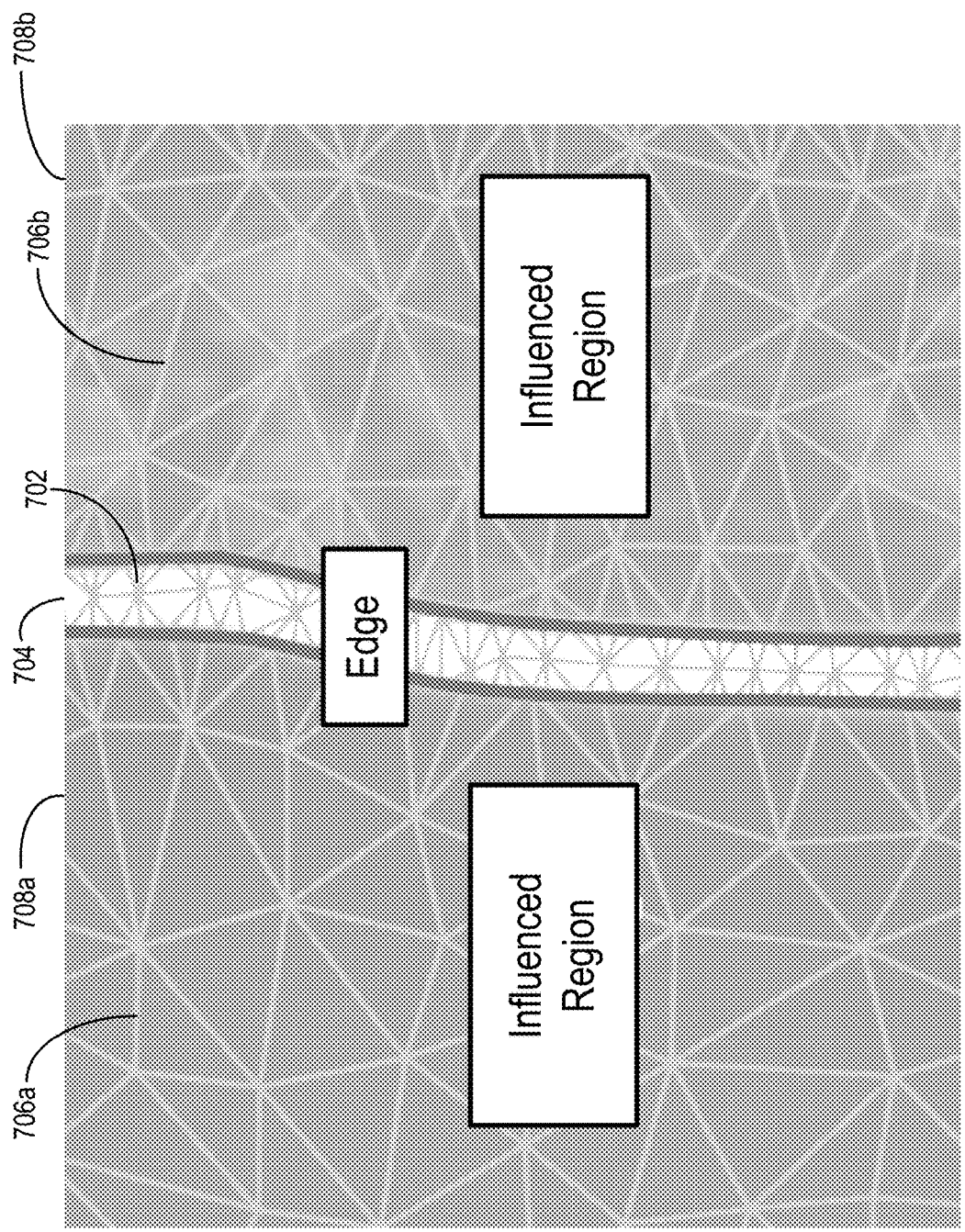
FIG. 7 illustrates meshes corresponding to an edge selected for transformation and adjacent influenced regions in accordance with one or more embodiments.

As mentioned above, in one or more embodiments, the edge transformation system 106 generates meshes corresponding to the edge selected for transformation and the adjacent influenced region(s). FIG. 7 illustrates meshes corresponding to an edge selected for transformation and adjacent influenced regions in accordance with one or more embodiments.

In particular, as shown in FIG. 7, the edge transformation system 106 generates a first mesh 702 corresponding to the edge 704. Further, as shown in FIG. 7, the edge transformation system 106 generates a second mesh 706a corresponding to the adjacent influenced region 708a and a third mesh 706b corresponding to the adjacent influenced region 708b.

In one or more embodiments, the edge transformation system 106 generates the meshes 702, 706a-706b bounded by vectors splines. For example, the edge transformation system 106 generates the first mesh 702 bounded by the additional vector spline generated for the edge 704 (e.g., so that the first mesh 702 does not extend beyond additional vector spline). Similarly, the edge transformation system 106 generates the second mesh 706a and the third mesh 706b bounded within their respective adjacent influenced region (e.g., so that the second mesh 706a and the third mesh 706b do not extend beyond the adjacent influenced regions 708a-708b, respectively).

Further, as shown in FIG. 7, the edge transformation system 106 generates the first mesh 702 to include a mesh density that is greater than the mesh densities of the second mesh 706a and the third mesh 706b. Indeed, in one or more embodiments, the edge transformation system 106 generates meshes having varied mesh densities. In particular, the edge transformation system 106 generates the mesh of an edge to have a relatively higher mesh density. By utilizing a higher mesh density for an edge selected for transformation, the edge transformation system 106 provides more precision in the transformations applied to the edge (while avoiding extensive computing resources associated with using a higher mesh density for all regions). Indeed, the edge transformation system 106 can make changes to one portion of the edge without incidentally changing adjacent portions of the edge.

In some cases, the edge transformation system generates meshes having the same mesh density for an edge selected for transformation and the adjacent influenced region(s). In some implementations, the edge transformation system 106 varies the mesh densities even among meshes corresponding to different adjacent influenced regions.

Additionally, as mentioned above, in one or more embodiments, the edge transformation system 106 modifies a digital image (e.g., generates an enhanced digital image) in response to a user interaction with an edge-targeting transformation handle generated for the digital image. In particular, in one or more embodiments, the edge transformation system 106 modifies the digital image by modifying the edge and the adjacent influenced regions. In some implementations, the edge transformation system 106 modifies the edge and adjacent influenced regions by modifying vector splines and meshes corresponding to the edge and adjacent influenced regions, respectively. FIGS. 8A-8D illustrate modifying an edge and adjacent influenced regions in accordance with one or more embodiments.

In particular, FIG. 8A illustrates modifying vector splines corresponding to an edge 802 and adjacent influenced regions 804a-804b of a digital image (not shown) based on a transformation of an edge-targeting transformation handle 806 in accordance with one or more embodiments. In particular, FIG. 8A illustrates modifying the edge 802 by modifying the vector spline 816 corresponding to the edge 802. FIG. 8A further illustrates modifying the adjacent influenced regions 804a-804b by modifying the vector splines 818a-818b corresponding to the adjacent influenced regions 804a-804b, respectively.

For example, in one or more embodiments, the edge transformation system 106 detects a user interaction with the edge-targeting transformation handle 806. Indeed, as previously mentioned, in some embodiments, the edge transformation system 106 provides the edge-targeting transformation handle 806 for display over the digital image on a computing device. Accordingly, in some instances, the edge transformation system 106 detects the user interaction with the edge-targeting transformation handle 806 via the computing device.

In particular, in one or more embodiments, the edge transformation system 106 detects a user interaction with an anchor handle (e.g., the anchor handle 810) corresponding to the anchor 808 of the edge-targeting transformation handle 806. In one or more embodiments, the edge transformation system 106 determines a transformation of the edge-targeting transformation handle 806 (e.g., a transformation of the anchor 808) based on the user interaction and modifies the edge-targeting transformation handle 806 accordingly. For example, as illustrated in FIG. 8A, in response to detecting the user interaction with an anchor handle corresponding to the anchor 808, the edge transformation system 106 moves the anchor 808 to the right.

As further shown in FIG. 8A, the edge transformation system 106 similarly modifies the edge 802. In particular, the edge transformation system 106 modifies the edge 802 by modifying the vector spline 816 corresponding to the edge 802 (e.g., corresponding to the outline of the edge 802). For example, in one or more embodiments, the edge transformation system 106 identifies the anchors 812a-812b of the vector spline 816 that correspond to the anchor 808 of the edge-targeting transformation handle 806. Accordingly, the edge transformation system 106 modifies the vector spline 816 based on the transformation of the edge-targeting transformation handle 806. For instance, as shown in FIG. 8A, the edge transformation system 106 moves the anchors 812a-812b of the vector spline 816 to the right (e.g., using anchor handles corresponding to the anchors 812a-812b).

Similarly, as illustrated in FIG. 8A, the edge transformation system 106 modifies the adjacent influenced regions 804a-804b. In particular, the edge transformation system 106 modifies the adjacent influenced regions 804a-804b by modifying the vector splines 818a-818b, respectively. For example, in one or more embodiments, the edge transformation system 106 identifies the anchors 814a-814b of the vector splines 818a-818b that correspond to the anchor 808 of the edge-targeting transformation handle 806. Accordingly, the edge transformation system 106 modifies the vector splines 818a-818b based on the transformation of the edge-targeting transformation handle 806. For instance, as shown in FIG. 8A, the edge transformation system 106 moves the anchors 814a-814b of the vector splines 818a-818b to the right (e.g., using anchor handles corresponding to the anchors 814a-814b).

Figure 8C:
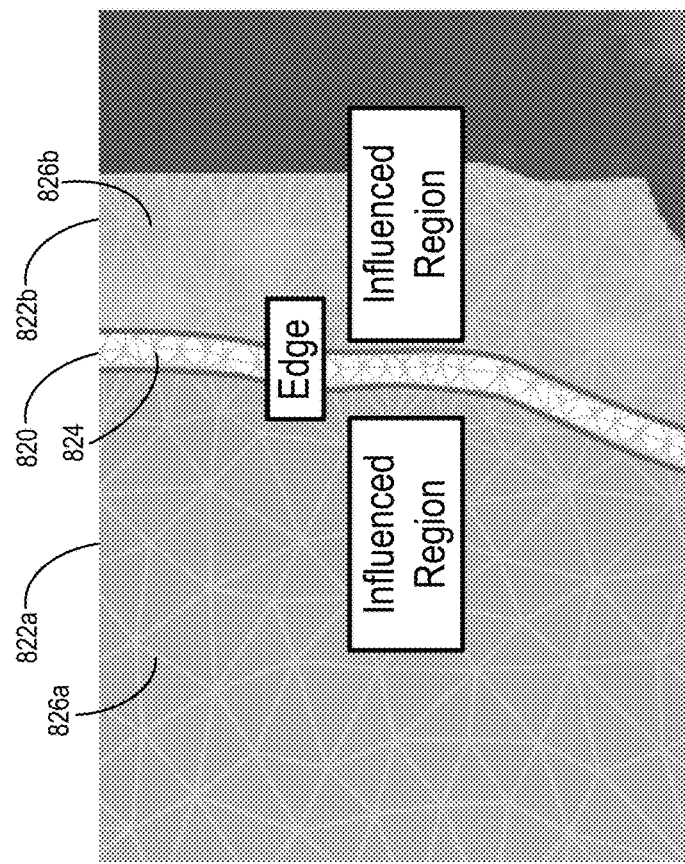
Figure 8B:
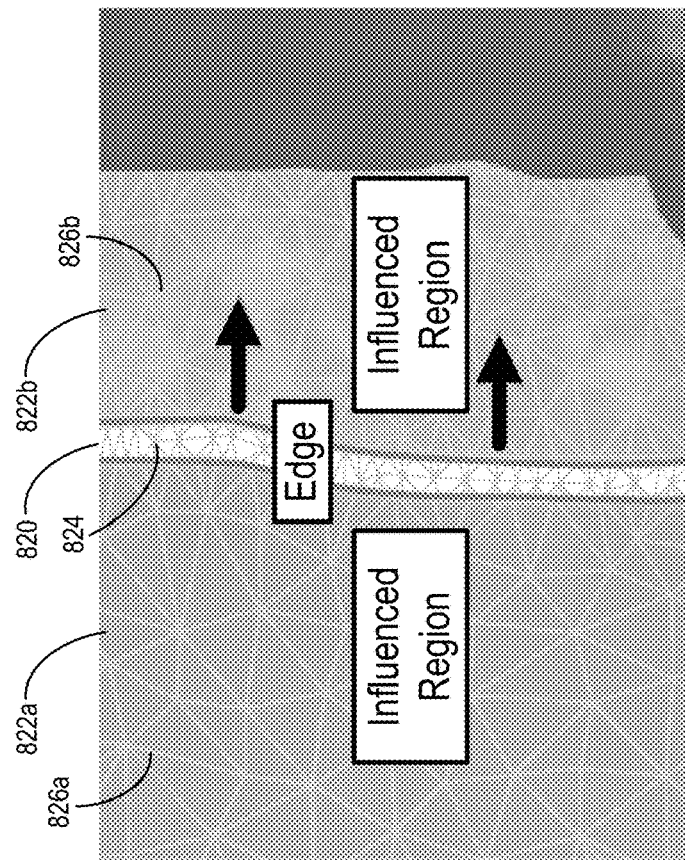

FIGS. 8B-8C illustrate modifying meshes corresponding to an edge 820 and adjacent influenced regions 822a-822b in accordance with one or more embodiments. In particular, FIG. 8B illustrates a transformation of the edge 820 that moves the edge 820 to the right. FIG. 8C illustrates the result of the transformation.

Indeed, as shown in FIGS. 8B-8C, the edge transformation system 106 modifies the edge 820 by modifying the mesh 824 corresponding to the edge 820. For example, in some cases, the edge transformation system 106 compresses or expands at least a portion of the mesh 824. Further, the edge transformation system 106 modifies the adjacent influenced regions 822a-822b by modifying the meshes 826a-826b, respectively. For example, in some cases, the edge transformation system 106 compresses or expands at least a portion of the meshes 826a-826b. In one or more embodiments, the edge transformation system 106 modifies the mesh 824 corresponding to the edge 820 and the meshes 826a-826b corresponding to the adjacent influenced regions 822a-822b simultaneously.

In one or more embodiments, the edge transformation system 106 modifies a mesh by modifying the corresponding vector spline. For example, in some implementations, the edge transformation system 106 modifies the mesh 824 by modifying the vector spline that corresponds to the outline of the edge 820 (e.g., the vector spline generated in addition to the vector spline determined for the edge-targeting transformation handle). Similarly, the edge transformation system 106 modifies the meshes 826a-826b by modifying the vector splines that correspond to the outlines of the adjacent influenced regions 822a-822b, respectively.

Accordingly, in one or more embodiments, the edge transformation system 106 detects a user interaction with an edge-targeting transformation handle generated for a digital image. In response, the edge transformation system 106 determines a transformation to the edge-targeting transformation handle based on the user interaction. The edge transformation system 106 further modifies the digital image by modifying the corresponding edge and the one or more adjacent influenced regions based on the transformation to the edge-targeting transformation handle. In particular, the edge transformation system 106 modifies the meshes corresponding to the edge and the adjacent influenced region(s) by modifying their respective vector splines (e.g., the vector spline that define the boundary of the mesh).

In some implementations, the edge transformation system 106 further modifies the pixels of the digital image itself based on the changes to the meshes. In particular, the edge transformation system 106 modifies the pixels associated with an adjacent influenced region or the pixels associated with an edge based on changes to the corresponding mesh. For example, in some cases, the edge transformation system 106 maps the pixels of a region (an adjacent influenced region or an edge) to the mesh corresponding to the region. In particular, the edge transformation system 106 maps the pixels to the polygons of the mesh. Thus, upon transforming the mesh of that region, the edge transformation system 106 utilizes the mapping to modify the underlying pixels. For example, the edge transformation system 106 utilizes the mapping to re-map the pixels to the modified polygons of the transformed mesh.

Figure 8D:

Thus, in one or more embodiments, the edge transformation system 106 generates an enhanced digital image in response to one or more user interactions with an edge-targeting transformation handle. FIG. 8D illustrates an enhanced digital image 830 in accordance with one or more embodiments. In particular, as shown in FIG. 8D, the edge transformation system 106 provides the enhanced digital image 830 for display within a graphical user interface 832 of a computing device 834. As shown in FIG. 8D, the enhanced digital image 830 includes an edge 836 that has been modified from the original digital image. Indeed, in one or more embodiments, the edge transformation system 106 modifies the edge 836 based on one or more user interactions with an edge-targeting transformation handle generated for the edge 836.

In one or more embodiments, the edge transformation system 106 transforms a digital image iteratively. In particular, the edge transformation system 106 iteratively transforms an edge and at least one adjacent influenced region portrayed in a digital image. For example, the edge transformation system 106 iteratively transforms the edge and the at least one influenced region based on iterative user interactions with an edge-targeting transformation handle.

To illustrate, in one or more embodiments, after making an initial modification to an edge and adjacent influenced region in response to an initial user interaction with an edge-targeting transformation handle, as discussed above, the edge transformation system 106 detects further user interaction with the edge-targeting transformation handle. Accordingly, the edge transformation system 106 further modifies the vector splines corresponding to the outlines of the edge and the adjacent influenced region based on the further user interaction. Additionally, the edge transformation system 106 further modifies the corresponding meshes. Thus, the edge transformation system 106 modifies the pixels of the digital image that are associated with the edge and the adjacent influenced region.

Accordingly, the edge transformation system 106 operates with improved efficiency when compared to many conventional systems. For example, the edge transformation system 106 provides user interfaces for efficient transformation of edges portrayed in digital images. Indeed, as discussed above, in some implementations, the edge transformation system 106 provides an edge-targeting transformation handle for display in association with an edge portrayed in a digital image. In response to detecting user interactions with the edge-targeting transformation handle, the edge transformation system 106 modifies the edge and one or more adjacent influenced regions by modifying their corresponding mesh. Accordingly, the edge transformation system 106 provides a graphical user interface that reduces the user interactions required to transform an edge portrayed in a digital image. In particular, the graphical user interface provided by the edge transformation system 106 reduces the need for numerous adjustments and fine tuning of edge modifications as is often required under conventional systems.

In one or more embodiments, the edge transformation system 106 transforms edges for various types of objects portrayed in digital images. Indeed, the above has generally discussed the edge transformation system 106 in the context of modifying a digital image, such as a photograph, that portrays a natural object. The edge transformation system 106, however, can similarly modify digital images portraying various other types of objects. For example, FIGS. 9A-9C illustrate modifying a digital image 902 that portrays an object 904 in accordance with one or more embodiments.

Figure 9C:
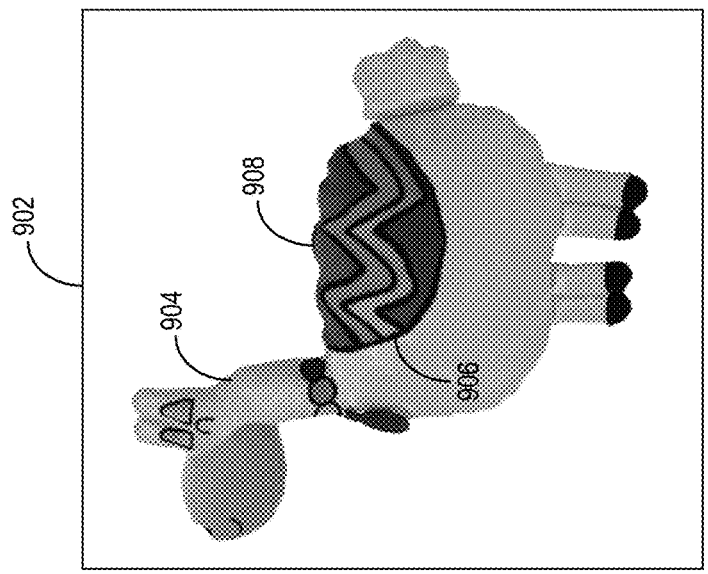
FIGS. 9A-9C illustrate modifying a digital image in accordance with one or more embodiments.
Figure 9B:
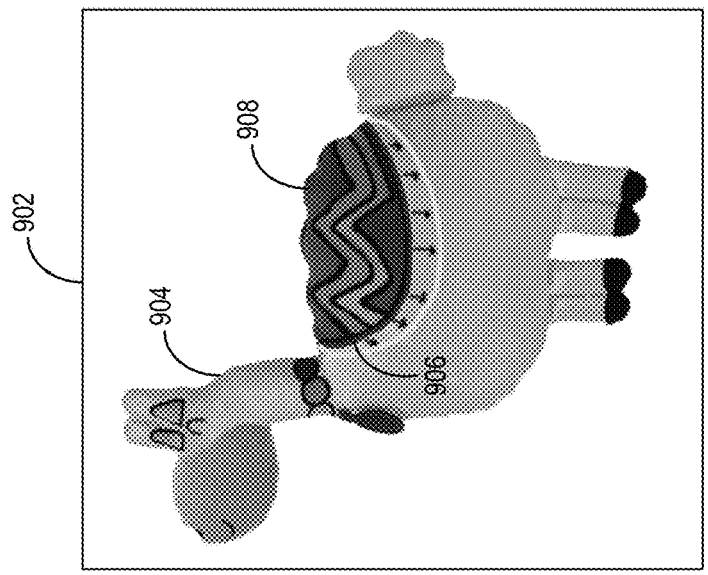
Figure 9A:
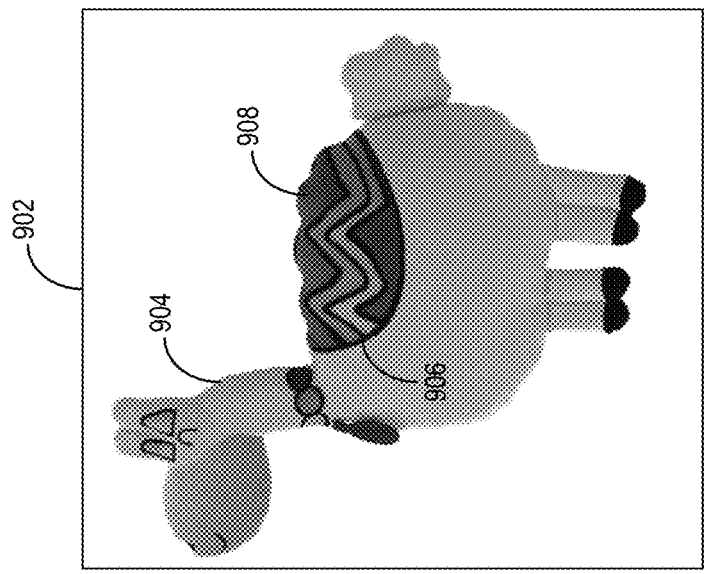

In particular, as shown in FIGS. 9A-9C, the object 904 includes a representation of an animal created using some material. In some cases, the object 904 represents an object composed of physical material that was photographed or an object that was digitally created. As illustrated, however, the digital image 902 portrays the object 904 having a texture and a pattern.

As shown in FIGS. 9A-9C, the edge transformation system 106 modifies the digital image 902 by modifying the edge 906 of the apparel 908 associated with the object 904. In particular, the edge transformation system 106 moves the edge 906 downward. Further, as shown, the edge transformation system 106 modifies one or more adjacent influenced regions comprising pixels proximate to the edge 906. For example, the edge transformation system 106 stretches the apparel 908 associated with the object 904 based on moving the edge 906 downward.

Figure 10:
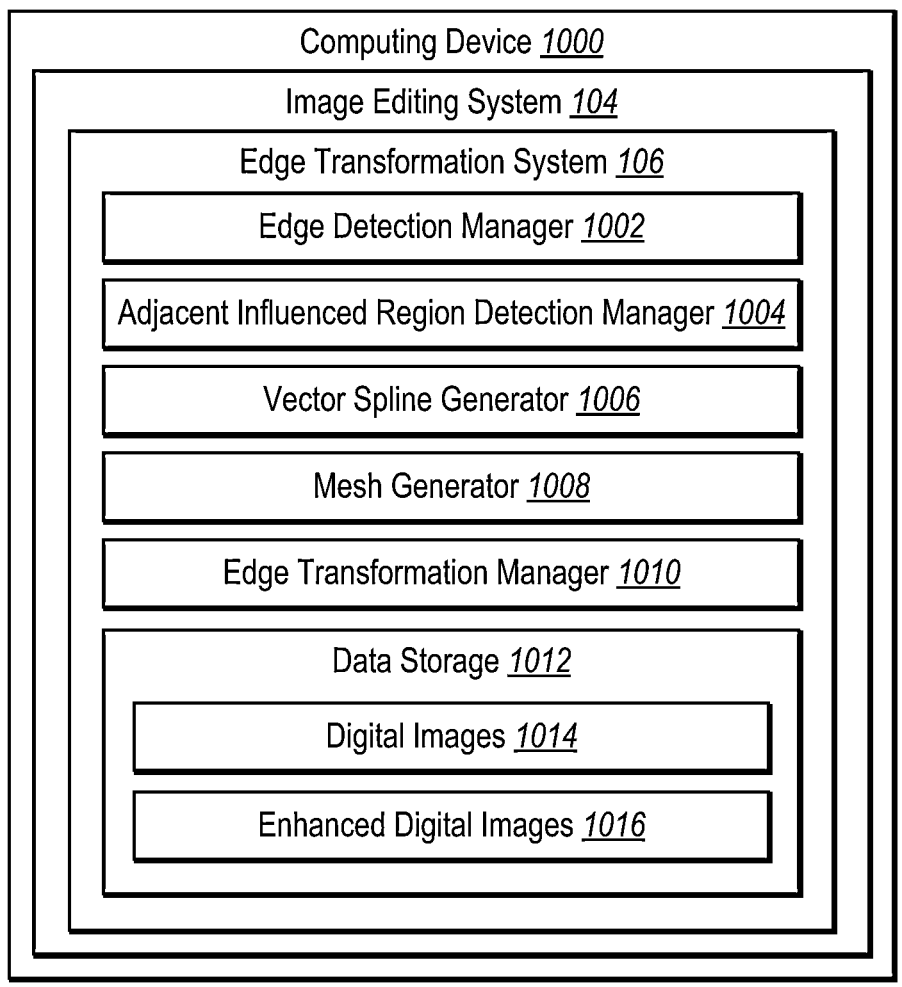
FIG. 10 illustrates an example schematic diagram of an edge transformation system in accordance with one or more embodiments.

Turning now to FIG. 10, additional detail will now be provided regarding various components and capabilities of the edge transformation system 106. In particular, FIG. 10 illustrates the edge transformation system 106 implemented by the computing device 1000 (e.g., the server(s) 102 and/or one of the client devices 110*a*-110*n* discussed above with reference to FIG. 1). Additionally, the edge transformation system 106 is also part of the image editing system 104. As shown, in one or more embodiments, the edge transformation system 106 includes, but is not limited to, an edge detection manager 1002, an adjacent influenced region detection manager 1004, a vector spline generator 1006, a mesh generator 1008, an edge transformation manager 1010, and data storage 1012 (which includes digital images 1014 and enhanced digital images 1016).

As just mentioned, and as illustrated in FIG. 10, the edge transformation system 106 includes the edge detection manager 1002. In one or more embodiments, the edge detection manager 1002 determines an edge from a digital image. In particular, the edge detection manager 1002 determines an edge for transformation. In some embodiments, the edge detection manager 1002 determines the edge by receiving a user selection of the edge. In some implementations, the edge detection manager 1002 determines the edge utilizing an edge detection algorithm.

Additionally, as shown in FIG. 10, the edge transformation system 106 includes the adjacent influenced region detection manager 1004. In one or more embodiments, the adjacent influenced region detection manager 1004 determines at least one adjacent influenced region from a digital image. In particular, the adjacent influenced region detection manager 1004 determines at least one adjacent influenced region to transform based on a transformation of the edge determined by the edge detection manager 1002. In one or more embodiments, the adjacent influenced region detection manager 1004 determines the at least one adjacent influenced region based on receiving one or more user interactions with the digital image that define the at least one adjacent influenced region. In some embodiments, the adjacent influenced region detection manager 1004 selects, as an adjacent influenced region, a set of pixels that are within a threshold distance from the edge. In some cases, the adjacent influenced region detection manager 1004, selects, as an adjacent influenced region, pixels bounded by the edge and another edge that is nearest to the edge.

Further, as shown in FIG. 10, the edge transformation system 106 includes the vector spline generator 1006. In one or more embodiments, the vector spline generator 1006 generates vector splines for the edge determined by the edge detection manager 1002 and the at least one adjacent influenced region determined by the adjacent influenced region detection manager 1004. For example, in some instances, the vector spline generator 1006 generates an edge-targeting transformation handle by determining a vector spline for the edge determined by the edge detection manager 1002. Further, the vector spline generator 1006 generates an additional vector spline for the edge. In some implementations, the vector spline generator 1006 also generates at least one additional vector spline for the at least one adjacent influenced region determined by the adjacent influenced region detection manager 1004.

As shown in FIG. 10, the edge transformation system 106 also includes the mesh generator 1008. In one or more embodiments, the mesh generator 1008 generates meshes corresponding to the edge determined by the edge detection manager 1002 and the at least one adjacent influenced region determined by the adjacent influenced region detection manager 1004. For example, in some embodiments, the mesh generator 1008 generates meshes bound within the vector splines corresponding to an outline of the edge and the at least one adjacent influenced region by the vector spline generator 1006. In one or more embodiments, the mesh generator 1008 generates the mesh corresponding to the edge to have a higher mesh density than the mesh(es) corresponding to the at least one adjacent influenced region.

As illustrated in FIG. 10, the edge transformation system 106 further includes the edge transformation manager 1010. In one or more embodiments, the edge transformation manager 1010 transforms the edge and the at least one adjacent influenced region in response to detecting a user interaction with the edge-targeting transformation handle generated by the vector spline generator 1006. In particular, the edge transformation manager 1010 transforms the edge and the at least one transformation manager by modifying their respective meshes. In one or more embodiments, the edge transformation manager 1010 modifies the meshes by modifying their respective vector splines.

Further, as shown in FIG. 10, the edge transformation system 106 includes data storage 1012. In particular, data storage 1012 includes digital images 1014 and enhanced digital images 1016. In one or more embodiments, digital images 1014 stores digital images that are transformed. For example, in some implementations, digital images 1014 stores digital images that portray at least one edge. In some embodiments, enhanced digital images 1016 stores modified digital images. For example, in some cases, enhanced digital images 1016 stores digital images that include at least one modified edge and at least one modified adjacent influenced region.

Each of the components 1002-1016 of the edge transformation system 106 can include software, hardware, or both. For example, the components 1002-1016 can include one or more instructions stored on a computer-readable storage medium and executable by processors of one or more computing devices, such as a client device or server device. When executed by the one or more processors, the computer-executable instructions of the edge transformation system 106 can cause the computing device(s) to perform the methods described herein. Alternatively, the components 1002-1016 can include hardware, such as a special-purpose processing device to perform a certain function or group of functions. Alternatively, the components 1002-1016 of the edge transformation system 106 can include a combination of computer-executable instructions and hardware.

Furthermore, the components 1002-1016 of the edge transformation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1016 of the edge transformation system 106 may be implemented as a stand-alone application, such as a desktop or mobile application. Furthermore, the components 1002-1016 of the edge transformation system 106 may be implemented as one or more web-based applications hosted on a remote server. Alternatively, or additionally, the components 1002-1016 of the edge transformation system 106 may be implemented in a suite of mobile device applications or "apps." For example, in one or more embodiments, the edge transformation system 106 can comprise or operate in connection with digital software applications such as ADOBE® PHOTOSHOP® or ADOBE® LIGHTROOM®. The foregoing are either registered trademarks or trademarks of Adobe Inc. in the United States and/or other countries.

FIGS. 1-10, the corresponding text and the examples provide a number of different methods, systems, devices, and non-transitory computer-readable media of the edge transformation system 106. In addition to the foregoing, one or more embodiments can also be described in terms of flowcharts comprising acts for accomplishing particular results, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for transforming an edge portrayed in a digital image in accordance with one or more embodiments. While FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts are performed, in a digital medium environment for editing digital images, as part of a computer-implemented method for performing edge-targeted edits. In some instances, a non-transitory computer-readable medium stores instructions thereon that, when executed by at least one processor, cause a computing device to perform the acts of FIG. 11. In some implementations, a system performs the acts of FIG. 11. For example, in one or more cases, a system includes one or more memory devices comprising a digital image. The system further includes one or more computing devices configured to cause the system to perform the acts of FIG. 11.

The series of acts 1100 includes an act 1102 of determining an edge and an adjacent influenced region from a digital image. For example, in one or more embodiments, the act 1102 involves determining, from a digital image displayed on a computing device, an edge and an adjacent influenced region comprising pixels proximate to the edge. In some embodiments, the edge transformation system 106 determines, from the digital image displayed on the computing device, the edge and the adjacent influenced region by determining the edge and the adjacent influenced region based on user input received via the computing device.

In some implementations, the edge transformation system 106 determines the edge from the digital image displayed on the computing device by: receiving, from the computing device, a user selection of the edge; or detecting the edge from the digital image utilizing an edge detection algorithm. Indeed, in at least one implementation, the edge transformation system 106 determines the edge from the digital image by detecting the edge from the digital image utilizing an edge detection algorithm.

In some instances, the edge transformation system 106 determines the adjacent influenced region from the digital image displayed on the computing device by: receiving, from the computing device, one or more user interactions with the digital image, the one or more user interactions defining the adjacent influenced region; selecting a set of pixels that are within a threshold distance from the edge; or selecting pixels bounded by the edge and a second edge that is nearest to the edge. For example, in at least one implementation, the edge transformation system 106 determines the adjacent influenced region from the digital image by utilizing an edge detection algorithm (e.g., to identify the edge) and a threshold distance from the edge to determine an outer edge of the adjacent influenced region.

In one or more embodiments, determining the adjacent influenced region comprises determining the pixels proximate to the edge by determining a first set of pixels associated with a first side of the edge. In some implementations, the edge transformation system 106 further determines an additional adjacent influenced region by determining a second set of pixels associated with a second side of the edge.

The series of acts 1100 also includes an act 1104 of generating an edge-targeting transformation handle for the digital image. For example, in one or more embodiments, the act 1104 involves generating an edge-targeting transformation handle for the digital image by determining a vector spline corresponding to the edge. In some embodiments, the edge transformation system 106 provides, for display on the computing device over the digital image, the edge-targeting transformation handle and a visual representation of the adjacent influenced region.

In one or more embodiments, the edge transformation system 106 determines the vector spline corresponding to the edge based on applying a threshold width to a set of pixels located in a center of the edge. In some instances, the edge transformation system 106 determines that the edge includes a variable thickness; and determines the vector spline corresponding to the edge by generating a closed vector spline that outlines the edge based on determining that the edge includes the variable thickness. In some implementations, the edge transformation system 106 determines the vector spline corresponding to the edge by generating a closed vector spline that outlines the edge based on determining that the edge includes a variable thickness.

In some instances, the edge transformation system 106 generates the edge-targeting transformation handle for the digital image by: determining a plurality of anchors and a plurality of corresponding anchor handles for the vector spline corresponding to the edge; and fixing a pair of anchors from the plurality of anchors that correspond to ends of the edge-targeting transformation handle to prevent modification of one or more pixels proximate to the ends of the edge-targeting transformation handle in response to user interactions with a pair of anchor handles corresponding to the pair of anchors.

Additionally, the series of acts 1100 includes an act 1106 of generating meshes for the edge and the adjacent influenced region. For example, in one or more embodiments, the act 1106 involves generating a first mesh corresponding to the edge and a second mesh corresponding to the adjacent influenced region.

In one or more embodiments, the edge transformation system 106 further generates a first additional vector spline corresponding to an outline of the edge; and generates a second additional vector spline corresponding to an outline of the adjacent influenced region and the outline of the edge. Accordingly, in some implementations, the edge transformation system 106 generates the first mesh corresponding to the edge by generating the first mesh bounded within the first additional vector spline corresponding to the outline of the edge; and generates the second mesh corresponding to the adjacent influenced region by generating the second mesh bounded within the second additional vector spline corresponding to the outline of the adjacent influenced region and the outline of the edge.

In some implementations, the edge transformation system 106 generates the first mesh corresponding to the edge and the second mesh corresponding to the adjacent influenced region by: generating a first mesh density for the first mesh; and generating a second mesh density for the second mesh, the second mesh density comprising a lower mesh density than the first mesh density.

Further, the series of acts 1100 includes an act 1108 of modifying the edge and the adjacent influenced region by modifying the meshes. For example, in one or more embodiments, the act 1108 involves, in response to detecting a user interaction with the edge-targeting transformation handle, modify the edge and the adjacent influenced region in the digital image by modifying the first mesh and the second mesh. Indeed, in some instances, in response to detecting a user interaction with the edge-targeting transformation handle, the edge transformation system 106 generates an enhanced digital image by modifying the edge and the adjacent influenced region from the digital image.

As mentioned above, in some implementations, the edge transformation system 106 generates a first additional vector spline corresponding to an outline of the edge; and generates a second additional vector spline corresponding to an outline of the adjacent influenced region and the outline of the edge. Accordingly, in some instances, the edge transformation system 106, in response to detecting the user interaction with the edge-targeting transformation handle, modifies the edge and the adjacent influenced region in the digital image by modifying the first mesh and the second mesh by: determining a transformation of the edge-targeting transformation handle based on the user interaction with the edge-targeting transformation handle; modifying the first mesh by modifying the first additional vector spline corresponding to the outline of the edge based on the transformation of the edge-targeting transformation handle; and modifying the second mesh by modifying the second additional vector spline corresponding to the outline of the adjacent influenced region and the outline of the edge based on the transformation of the edge-targeting transformation handle.

In one or more embodiments, the edge transformation system 106 provides, for display over the digital image, the edge-targeting transformation handle and a plurality of anchor handles corresponding to the edge-targeting transformation handle. Accordingly, in some implementations, the edge transformation system 106 detects the user interaction with the edge-targeting transformation handle by detecting the user interaction with at least one anchor handle from the plurality of anchor handles.

To provide an illustration, in one or more embodiments, the edge transformation system 106 determines, from a digital image, an edge and an adjacent influenced region comprising pixels proximate to the edge; generates an edge-targeting transformation handle for the digital image by determining a vector spline corresponding to the edge; determines a first additional vector spline corresponding to an outline of the edge; determines a second additional vector spline corresponding to an outline of the adjacent influenced region and the outline of the edge; generates a first mesh bounded by the first additional vector spline corresponding to the outline of the edge and a second mesh bounded by the second additional vector spline corresponding to the outline of the adjacent influenced region and the outline of the edge; and, in response to detecting a user interaction with the edge-targeting transformation handle, modify the edge and the adjacent influenced region in the digital image by modifying the first mesh and the second mesh.

In some embodiments, the series of acts 1100 further includes acts for modifying one or more additional adjacent influenced regions. For example, in some implementations, the acts include determining, from the digital image displayed on the computing device, an additional adjacent influenced region comprising additional pixels proximate to the edge; generating a third mesh corresponding to the additional adjacent influenced region; and, in response to detecting the user interaction with the edge-targeting transformation handle, modify the additional adjacent influenced region in the digital image by modifying the third mesh.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
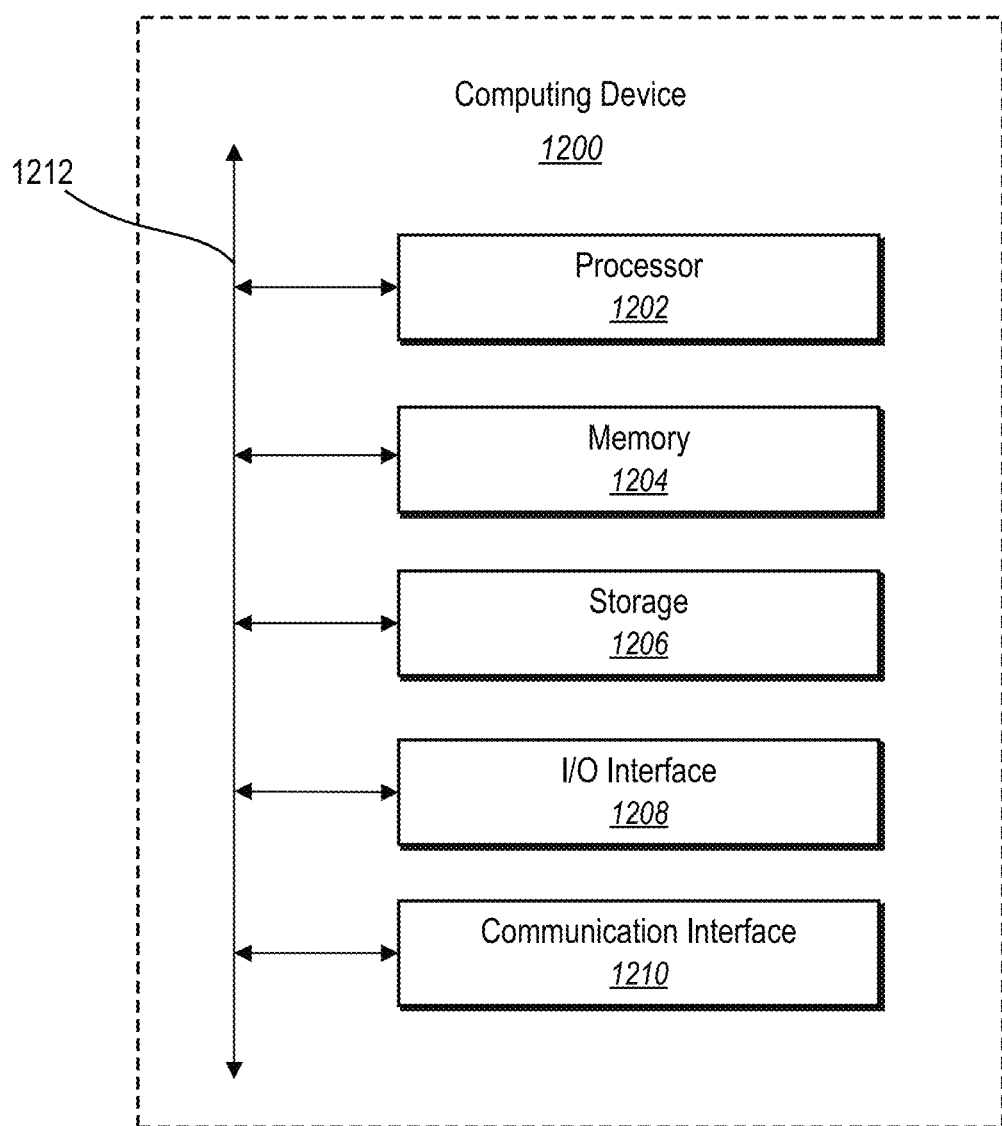
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 102 and/or the client devices 110a-110n). In one or more embodiments, the computing device 1200 may be a mobile device (e.g., a mobile telephone, a smartphone, a PDA, a tablet, a laptop, a camera, a tracker, a watch, a wearable device). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions, which when executed by a processing device, cause the processing device to perform operations comprising:
   determining, from a digital image displayed on a computing device, an edge and an adjacent influenced region;
   generating an edge-targeting transformation handle for the digital image by determining a vector spline corresponding to the edge;
   generating a first mesh corresponding to the edge and a second mesh corresponding to the adjacent influenced region; and
   in response to detecting a user interaction with the edge-targeting transformation handle, modifying the edge and the adjacent influenced region in the digital image by modifying the first mesh and the second mesh.

2. The non-transitory computer-readable medium of claim 1, further comprising instructions that, when executed by the processing device, cause the processing device to perform operations comprising:
   generating a first additional vector spline corresponding to an outline of the edge; and
   generating a second additional vector spline corresponding to an outline of the adjacent influenced region and the outline of the edge.

3. The non-transitory computer-readable medium of claim 2, wherein, in response to detecting the user interaction with the edge-targeting transformation handle, modifying the edge and the adjacent influenced region in the digital image by modifying the first mesh and the second mesh comprises:
   determining a transformation of the edge-targeting transformation handle based on the user interaction with the edge-targeting transformation handle;
   modifying the first mesh by modifying the first additional vector spline corresponding to the outline of the edge based on the transformation of the edge-targeting transformation handle; and
   modifying the second mesh by modifying the second additional vector spline corresponding to the outline of the adjacent influenced region and the outline of the edge based on the transformation of the edge-targeting transformation handle.

4. The non-transitory computer-readable medium of claim 2, wherein:
   generating the first mesh corresponding to the edge comprises generating the first mesh bounded within the first additional vector spline corresponding to the outline of the edge; and
   generating the second mesh corresponding to the adjacent influenced region comprises generating the second mesh bounded within the second additional vector spline corresponding to the outline of the adjacent influenced region and the outline of the edge.

5. The non-transitory computer-readable medium of claim 1, wherein generating the first mesh corresponding to the edge and the second mesh corresponding to the adjacent influenced region comprises:
   generating a first mesh density for the first mesh; and
   generating a second mesh density for the second mesh, the second mesh density comprising a lower mesh density than the first mesh density.

6. The non-transitory computer-readable medium of claim 1, wherein determining the vector spline corresponding to the edge comprises determining the vector spline based on applying a threshold width to a set of pixels located in a center of the edge.

7. The non-transitory computer-readable medium of claim 1, further comprising instructions that, when executed by the processing device, cause the processing device to perform operations comprising:
   determining that the edge includes a variable thickness, wherein determining the vector spline corresponding to the edge comprises generating a closed vector spline that outlines the edge based on determining that the edge includes the variable thickness.

8. The non-transitory computer-readable medium of claim 1, further comprising instructions that, when executed by the processing device, cause the processing device to perform operations comprising:
   determining, from the digital image displayed on the computing device, an additional adjacent influenced region;
   generating a third mesh corresponding to the additional adjacent influenced region; and
   in response to detecting the user interaction with the edge-targeting transformation handle, modifying the additional adjacent influenced region in the digital image by modifying the third mesh.

9. The non-transitory computer-readable medium of claim 1, further comprising instructions that, when executed by the processing device, cause the processing device to perform operations comprising providing, for display on the computing device over the digital image, the edge-targeting transformation handle and a visual representation of the adjacent influenced region.

10. The non-transitory computer-readable medium of claim 1, wherein determining the edge from the digital image displayed on the computing device comprises:
    receiving, from the computing device, a user selection of the edge; or
    detecting the edge from the digital image utilizing an edge detection algorithm.

11. The non-transitory computer-readable medium of claim 1, wherein determining the adjacent influenced region from the digital image displayed on the computing device comprises:
    receiving, from the computing device, one or more user interactions with the digital image, the one or more user interactions defining the adjacent influenced region;
    selecting a set of pixels that are within a threshold distance from the edge; or
    selecting pixels bounded by the edge and a second edge that is nearest to the edge.

12. A system comprising:
    one or more memory components; and
    one or more processing devices coupled to the one or more memory components, the one or more processing devices to perform operations comprising:
        determining, from a digital image, an edge and an adjacent influenced region;

generating an edge-targeting transformation handle for the digital image by determining a vector spline corresponding to the edge;
determining a first additional vector spline corresponding to an outline of the edge;
determining a second additional vector spline corresponding to an outline of the adjacent influenced region and the outline of the edge;
generating a first mesh bounded by the first additional vector spline corresponding to the outline of the edge and a second mesh bounded by the second additional vector spline corresponding to the outline of the adjacent influenced region and the outline of the edge; and
in response to detecting a user interaction with the edge-targeting transformation handle, modifying the edge and the adjacent influenced region in the digital image by modifying the first mesh and the second mesh.

13. The system of claim 12, wherein generating the edge-targeting transformation handle for the digital image comprises:
determining a plurality of anchors and a plurality of corresponding anchor handles for the vector spline corresponding to the edge; and
fixing a pair of anchors from the plurality of anchors that correspond to ends of the edge-targeting transformation handle to prevent modification of one or more pixels proximate to the ends of the edge-targeting transformation handle in response to user interactions with a pair of anchor handles corresponding to the pair of anchors.

14. The system of claim 12, wherein determining the vector spline corresponding to the edge comprises generating a closed vector spline that outlines the edge based on determining that the edge includes a variable thickness.

15. The system of claim 12, wherein determining the adjacent influenced region from the digital image comprises utilizing an edge detection algorithm and a threshold distance from the edge to determine an outer edge of the adjacent influenced region.

16. The system of claim 12, wherein the one or more processing devices further perform operations comprising:
providing, for display over the digital image, the edge-targeting transformation handle and a plurality of anchor handles corresponding to the edge-targeting transformation handle,
wherein detecting the user interaction with the edge-targeting transformation handle by comprises detecting the user interaction with at least one anchor handle from the plurality of anchor handles.

17. The system of claim 12, wherein determining the edge from the digital image comprises detecting the edge from the digital image utilizing an edge detection algorithm.

18. A method comprising:
determining, from a digital image displayed on a computing device, an edge and an adjacent influenced region;
generating an edge-targeting transformation handle for the digital image by determining a vector spline corresponding to the edge;
generating a first mesh corresponding to the edge and a second mesh corresponding to the adjacent influenced region; and
in response to detecting a user interaction with the edge-targeting transformation handle, modifying the edge and the adjacent influenced region in the digital image by modifying the first mesh and the second mesh.

19. The method of claim 18, wherein determining, from the digital image displayed on the computing device, the edge and the adjacent influenced region comprises determining the edge and the adjacent influenced region based on user input received via the computing device.

20. The method of claim 18,
wherein determining the adjacent influenced region comprises determining a first set of pixels associated with a first side of the edge; and
further comprising determining an additional adjacent influenced region by determining a second set of pixels associated with a second side of the edge.

* * * * *